(12) United States Patent
Ohta

(10) Patent No.: US 8,223,120 B2
(45) Date of Patent: Jul. 17, 2012

(54) COMPUTER READABLE RECORDING MEDIUM RECORDING IMAGE PROCESSING PROGRAM AND IMAGE PROCESSING APPARATUS

(75) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 727 days.

(21) Appl. No.: 12/352,716

(22) Filed: Jan. 13, 2009

(65) Prior Publication Data

US 2010/0060575 A1 Mar. 11, 2010

(30) Foreign Application Priority Data

Sep. 5, 2008 (JP) ................................. 2008-228608

(51) Int. Cl.
*G09G 5/00* (2006.01)
(52) U.S. Cl. .......................... 345/156; 345/158; 345/419
(58) Field of Classification Search .................. None
See application file for complete search history.

(56) References Cited

U.S. PATENT DOCUMENTS

| 5,253,051 | A | * | 10/1993 | McManigal | .................. | 348/121 |
|---|---|---|---|---|---|---|
| 5,574,479 | A | | 11/1996 | Odell | | |
| 5,627,565 | A | | 5/1997 | Morishita et al. | | |
| 6,982,697 | B2 | | 1/2006 | Wilson et al. | | |
| 7,139,983 | B2 | | 11/2006 | Kelts | | |
| 7,158,118 | B2 | | 1/2007 | Liberty | | |
| 7,262,760 | B2 | | 8/2007 | Liberty | | |
| 7,292,151 | B2 | | 11/2007 | Ferguson et al. | | |
| 7,414,611 | B2 | | 8/2008 | Liberty | | |
| 7,621,812 | B2 | * | 11/2009 | Kawamoto et al. | ............. | 463/30 |
| 2003/0142068 | A1 | | 7/2003 | DeLuca et al. | | |
| 2005/0089212 | A1 | * | 4/2005 | Mashitani et al. | ............ | 382/154 |
| 2007/0270220 | A1 | * | 11/2007 | Kaneshige et al. | ............. | 463/37 |
| 2008/0094353 | A1 | | 4/2008 | Marks | | |
| 2008/0113792 | A1 | * | 5/2008 | Yamada et al. | ................. | 463/30 |

FOREIGN PATENT DOCUMENTS

| EP | 0 583 060 | 2/1994 |
|---|---|---|
| EP | 0 817 125 | 1/1998 |
| EP | 1 762 287 | 3/2007 |
| JP | 6-208435 | 7/1994 |

OTHER PUBLICATIONS

ADXL202 Specification Sheet: Low Cost ±2 g Dual Axis i MEMs® Accelerometer with Digital Output; Analog Devices, Inc., 1998.
ADXL330 Specification Sheet: Small, Low Power, 3-Axis ±3 g i MEMs® Accelerometer; Analog Devices, Inc., 2007.
Pictures of Microsoft Xwand retrieved on May 13, 2009 from http://www.kf12.com/blogs/uploads/xwand.jpg and http://www.cs.cmu.edu/%7Edwilson/images/xwand.jpg.

(Continued)

*Primary Examiner* — Lixi C Simpson
(74) *Attorney, Agent, or Firm* — Nixon & Vanderhye P.C.

(57) ABSTRACT

Displayed region size data indicating a size of a screen of a display device, or a size of a region in which an image of a virtual space is displayed on the screen, is obtained. Distance data indicating a distance between a user and the display device is obtained. A position and an angle of view of the virtual camera in the virtual space are set based on the displayed region size data and the distance data.

29 Claims, 18 Drawing Sheets

OTHER PUBLICATIONS

Wilson, Andrew D., et al.; "Demonstration of the XWand Interface for Intelligent Spaces"; Microsoft Research; UIST '02 Companion; pp. 37-38.

Wilson, Daniel, et al.; "Gesture Recognition Using the XWand"; Robotics Institute; Carnegie Mellon University; tech report CMU-RI-TR-04-57; Apr. 2004.

Wilson, Andy, "XWand: UI for Intelligent Environments"; Apr. 26, 2004; retrieved May 12, 2009 from http://research.microsoft.com/en-us/um/people/awilson/wand/default.htm.

Wilson, Andrew, et al.; "XWand: UI for Intelligent Spaces"; Microsoft Research; CHI 2003, Apr. 5-10, 2003; Ft. Lauderdale, FL.

Selectech Air Mouse, Description; retrieved on May 5, 2009 from http://cgi.ebay.com.my/ws/eBayISAPI.dII?ViewItem&item=350096666675&indexURL.

Office Action (7 pages), dated Apr. 19, 2012 issued in co-pending U.S. Appl. No. 13/350,183.

* cited by examiner

FIG. 3
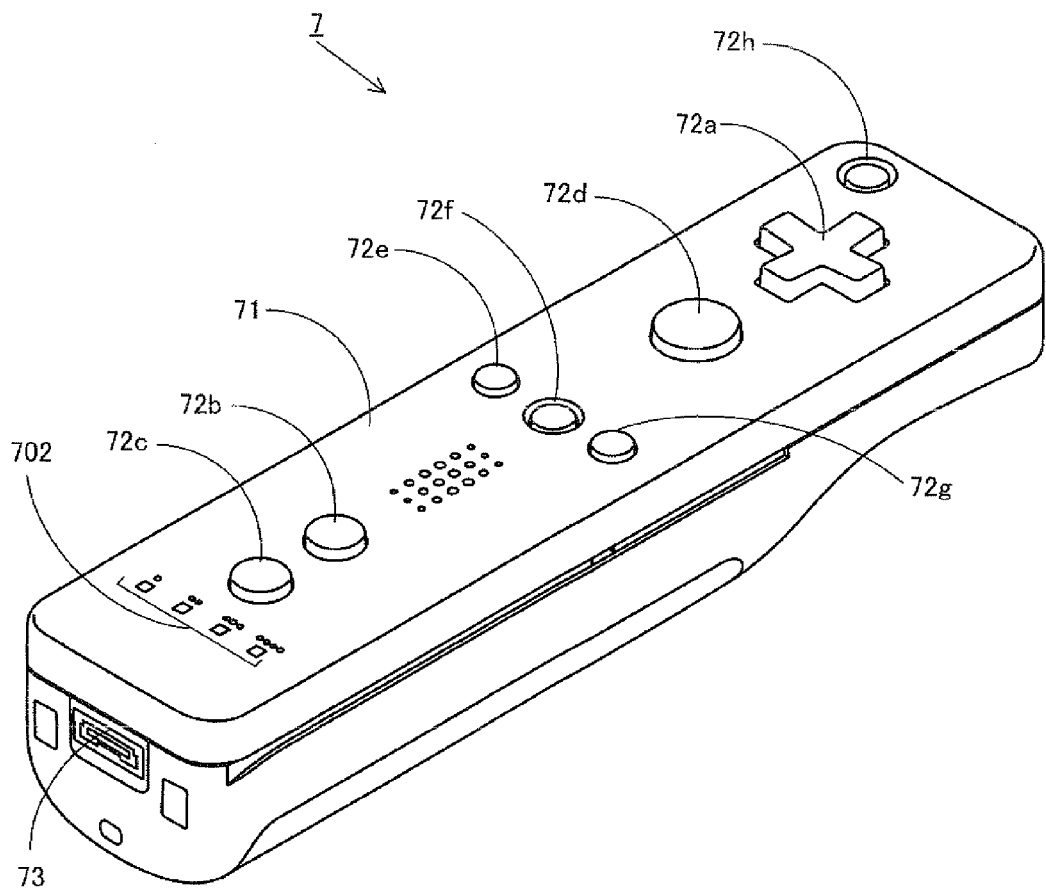
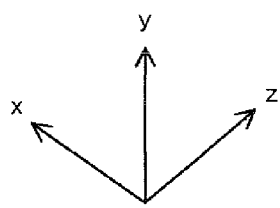

F I G. 4
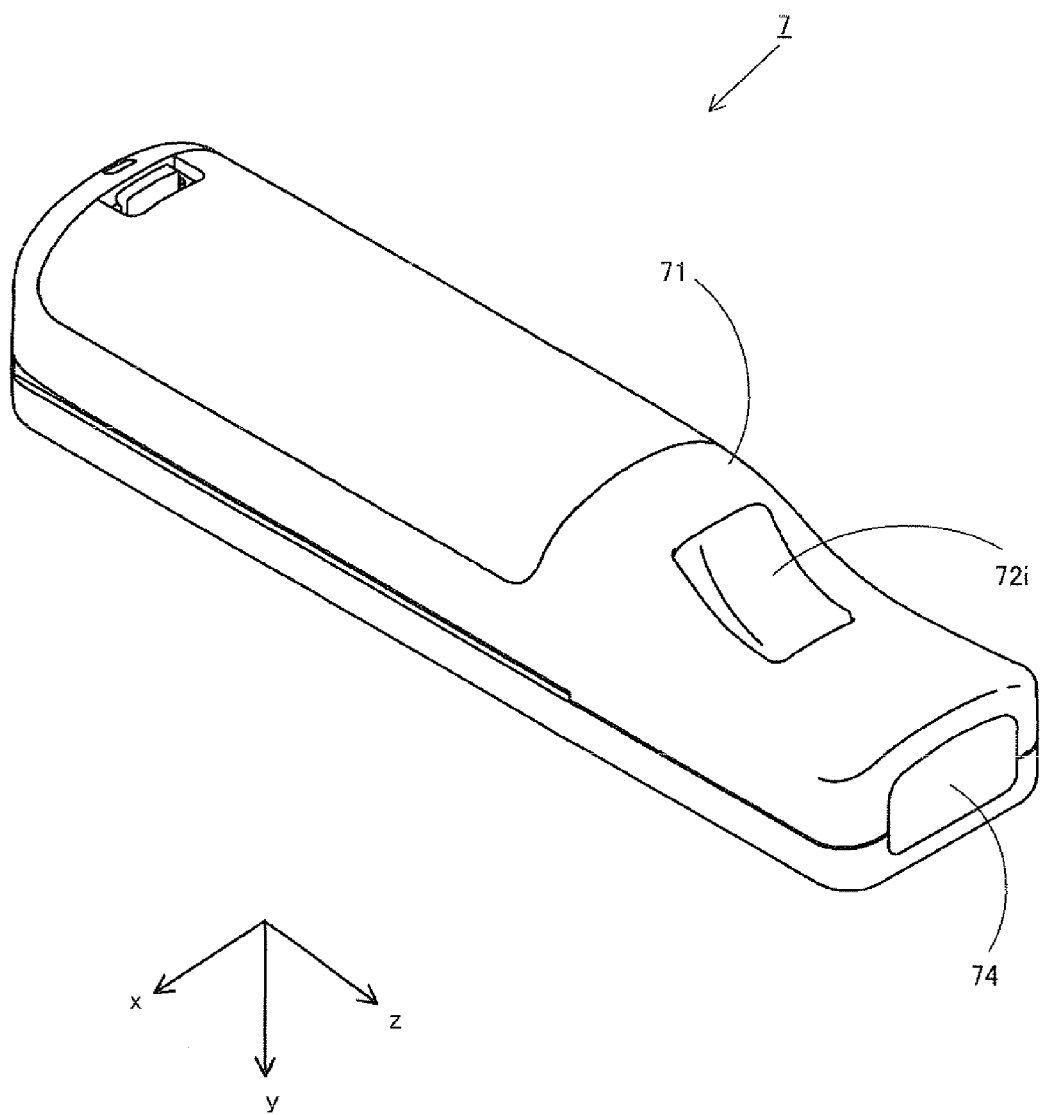

F I G. 1 5 A
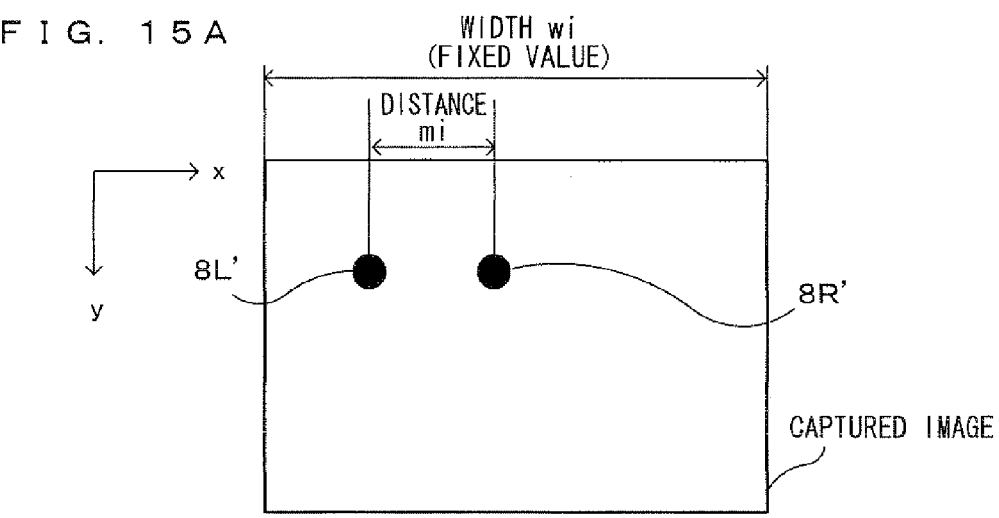
F I G. 1 5 B
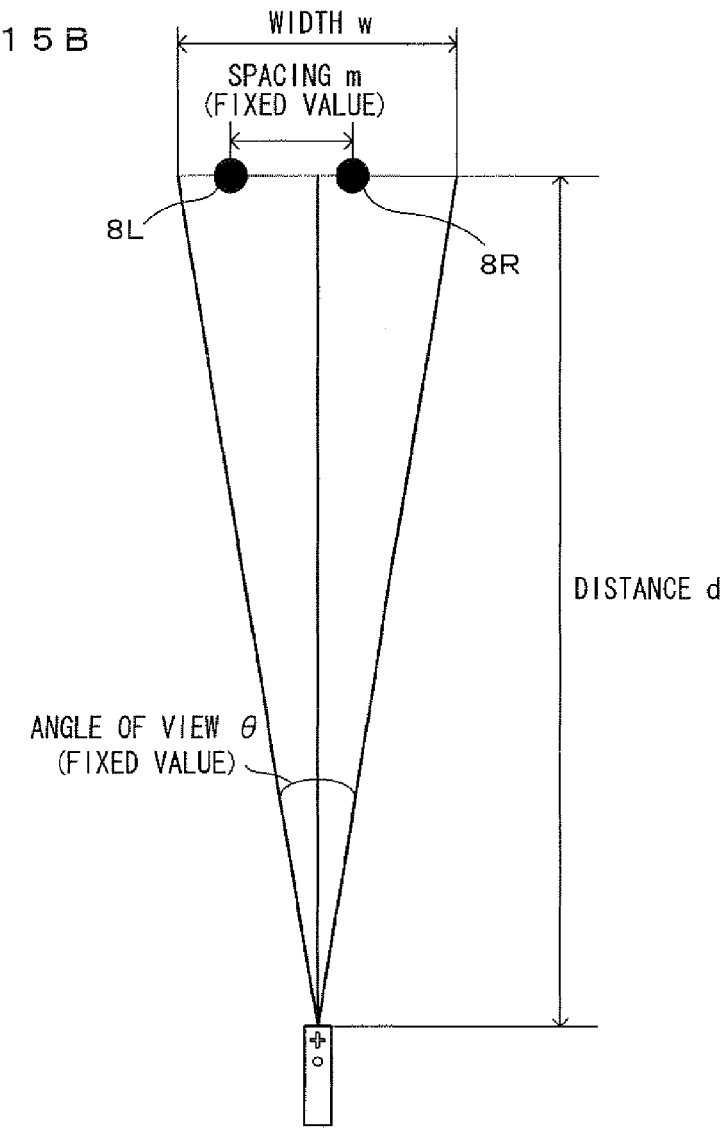

VIRTUAL CAMERA

1m

COMPUTER READABLE RECORDING MEDIUM RECORDING IMAGE PROCESSING PROGRAM AND IMAGE PROCESSING APPARATUS

CROSS REFERENCE TO RELATED APPLICATION

The disclosure of Japanese Patent Application No. 2008-228608, filed Sep. 5, 2008, is incorporated herein by reference.

FIELD

The technology herein relates to a computer readable recording medium recording an image processing program that is executed by a computer of an image processing apparatus that outputs an image of a virtual space captured by a virtual camera to a display device, and the image processing apparatus. More particularly, the technology herein relates to settings of the virtual camera in the virtual space.

BACKGROUND AND SUMMARY

Conventionally, a game apparatus is known that captures an image of an object in a virtual space using a virtual camera and displays the image on a display device (e.g., Japanese Patent Laid-Open Publication Nos. 2002-163676 and 2001-149643). In the game apparatus disclosed in Japanese Patent Laid-Open Publication No. 2002-163676, a determination boundary box including a plurality of objects in a game space is calculated, and it is determined whether or not the determination boundary box falls within the screen in accordance with settings at that time of the virtual camera. When the settings of the virtual camera do not cause the determination boundary box to fall within the screen, at least one of a position, an orientation, and an angle of view of the virtual camera is changed so as to cause the determination boundary box to fall within the screen.

Also, in the game apparatus disclosed in Japanese Patent Laid-Open Publication No. 2001-149643, when an enemy character exists within a predetermined distance range from a position of a player character, a virtual camera control means is used to calculate a position and an orientation of the virtual camera that allow the player character to follow the enemy character and exist within the sight of the player, based on positions and orientations of an enemy object and a player object. Thereafter, the virtual camera is set, and an image of a sight viewed from the virtual camera is generated.

However, game apparatuses as described above conventionally have the following problems. In the process disclosed in each of the aforementioned patent documents, the position and the angle of view of the virtual camera are set with reference to the position or the like of an object in the virtual space. Specifically, the position or the like of the virtual camera is determined so that predetermined objects (e.g., both a player object and an enemy object) fall within the single screen. For example, it is assumed that an image of three cubic models is captured by the virtual camera and is displayed. Firstly, it is assumed that the virtual space and the real space have the same scale (the size of a cube in the real space and the size of a cubic model in the virtual space have a ratio of 1:1). As shown in FIG. 18A, it is also assumed that the position and the angle of view of the virtual camera are set so that all the three cubes are displayed within the screen. In FIG. 18A, a distance from the cubes to the virtual camera is assumed to be 1 m. As a result, all the three cubes are displayed on the screen as shown in FIG. 18B.

On the other hand, it is assumed that, in the real space, the player is located a distance away from a television having the screen as shown in FIG. 19. In FIG. 19, the distance between the television and the player is assumed to be 3 m. It is also assumed that the cubes actually exist in the real space. For example, the screen of the television is considered as a "window", and the cubes are assumed to actually exist immediately behind the window. Specifically, FIG. 20 shows a positional relationship among the player, the television and the cubes when it is assumed that the cubes actually exist. In this case, a region (visual angle) that is viewed by the player through a window (television) is a region that is indicated by a dashed line 901 of FIG. 20. Therefore, a region 902 is a region that is normally not viewed from the player. In other words, the player can normally view only one middle cube that is located behind the window (television).

However, even in the case of a positional relationship as shown in FIG. 20, the three cubes are displayed on the screen as show in FIG. 18B (i.e., the three cubes are seen in the window). When the three cubes apparently fall within the single screen as viewed from the position of the player of FIG. 20, this displayed image of the three cubes is unnatural as compared to an image that would be seen if the cubes were in the real space. Therefore, when it is assumed that the three cubes actually exist behind the television in the real space, the displayed image is unnatural for an image that would be seen from the position of the player. Such an unnatural image causes the player to feel that something is wrong, i.e., the image is less realistic.

Therefore, an object certain example embodiments provide a computer readable recording medium recording an image processing program and an image processing apparatus capable of achieving a more realistic expression.

Certain example embodiments have the following features to attain the object mentioned above. Note that reference numerals, additional descriptions and the like inside parentheses in this section indicate correspondence to embodiments described below for the sake of easy understanding, and do not limit the present invention.

A first aspect of certain example embodiments is directed to a computer readable recording medium recording an image processing program executable by a computer of an image processing apparatus for outputting an image of a virtual space captured by a virtual camera to a display device (2). The program causes the computer to function as a displayed region size obtaining means (S1), a distance obtaining means (S5), and a virtual camera setting means (S6 to S8). The displayed region size obtaining means obtains displayed region size data indicating a size of a screen of the display device, or a size of a region in which the image of the virtual space is displayed on the screen. The distance obtaining means obtains distance data indicating a distance between a user and the display device. The virtual camera setting means sets a position and an angle of view of the virtual camera in the virtual space based on the displayed region size data and the distance data.

Thus, according to the first aspect, it is possible to prevent the image of the virtual space displayed on the display device from being unnatural for an image that is seen from a position of the player. As a result, a more realistic virtual space can be displayed as if it existed at a position where the display device is located (or in the display device). Thereby, it is possible to substantially prevent the user from feeling that something is wrong.

In a second aspect based on the first aspect, the displayed region size data includes data indicating a width in a predetermined first direction and a width in a second direction perpendicular to the first direction, of the screen of the display device or the region in which the image of the virtual space is displayed on the screen. The virtual camera setting means sets a horizontal angle of view and a vertical angle of view of the virtual camera, based on the first-direction width and the second-direction width included in the displayed region size data.

Thus, according to the second aspect, the horizontal angle of view and the vertical angle of view of the virtual camera are determined based on a vertical width and a horizontal width on the screen of the region in which the image of the virtual space is displayed. Thereby, a more realistic image can be displayed.

In a third aspect based on the first aspect, the displayed region size data includes data indicating a width in a predetermined first direction and a width in a second direction perpendicular to the first direction, of the screen of the display device or the region in which the image of the virtual space is displayed on the screen. The virtual camera setting means sets a horizontal angle of view and a vertical angle of view of the virtual camera, based on the first-direction width or the second-direction width included in the displayed region size data.

Thus, according to the third aspect, the horizontal angle of view and the vertical angle of view of the virtual camera are determined based on a vertical width or a horizontal width on the screen of the region in which the image of the virtual space is displayed. Thereby, a more realistic image can be displayed.

In a fourth aspect based on the second aspect, the virtual camera setting means sets the horizontal angle of view and/or the vertical angle of view of the virtual camera to be larger as the first-direction width and/or the second-direction width increase.

In a fifth aspect based on the third aspect, the virtual camera setting means sets the horizontal angle of view and/or the vertical angle of view of the virtual camera to be larger as the first-direction width and/or the second-direction width increase.

Thus, according to the fourth and fifth aspects, the angle of view of the virtual camera can be adjusted, depending on a size of the screen of the display device or the region in which the image of the virtual space is displayed. Thereby, a more realistic image can be displayed.

In a sixth aspect based on the second aspect, the virtual camera setting means sets the horizontal angle of view and/or the vertical angle of view to be smaller as the distance indicated by the distance data increases.

In a seventh aspect based on the third aspect, the virtual camera setting means sets the horizontal angle of view and/or the vertical angle of view to be smaller as the distance indicated by the distance data increases.

Thus, according to the sixth and seventh aspects, even when the user himself or herself moves, so that the distance between the user and the display device is changed, a highly realistic image corresponding to the distance can be displayed.

In an eighth aspect based on the first aspect, the virtual camera setting means sets the angle of view of the virtual camera to be larger as the screen of the display device or the region in which the image of the virtual space is displayed on the screen increases.

Thus, according to the eighth aspect, the angle of view of the virtual camera can be adjusted, depending on a size of the screen of the display device or the region in which the image of the virtual space is displayed. Thereby, a more realistic image can be displayed.

In a ninth aspect based on the first aspect, the virtual camera setting means sets the angle of view to be smaller as the distance indicated by the distance data increases.

Thus, according to the ninth aspect, even when the user himself or herself moves, so that the distance between the user and the display device is changed, a highly realistic image corresponding to the distance can be displayed.

In a tenth aspect based on the first aspect, the distance obtaining means includes a captured image data obtaining means (S5) and a distance calculating means (S5). The captured image data obtaining means obtains captured image data output from an input device (7) including an image capturing means for capturing an image of at least one imaging subject which is placed in a vicinity of the display device. The distance calculating means calculates a distance between the input device and the imaging subject as a distance between the user and the display device, based on the imaging subject shown in the captured image indicated by the captured image data.

Thus, according to the tenth aspect, the distance can be obtained more accurately, so that a more realistic image can be displayed.

In an eleventh aspect based on the tenth aspect, the distance calculating means calculates the distance between the input device and the imaging subject based on a size of the imaging subject shown in the captured image.

In a twelfth aspect based on the eleventh aspect, the distance between the input device and the imaging subject that is calculated by the distance calculating means has a smaller value as the size of the imaging subject shown in the captured image increases.

In a thirteenth aspect based on the tenth aspect, the distance calculating means calculates the distance between the input device and the imaging subject based on a distance between a plurality of imaging subjects shown in the captured image.

In a fourteenth aspect based on the thirteenth aspect, the distance between the input device and the imaging subject that is calculated by the distance calculating means has a smaller value as a distance between a plurality of imaging subjects increases.

Thus, according to the eleventh to fourteenth aspects, the distance between the imaging subject and the input device can be calculated by an easier process, so that the efficiency of a process by a computer can be increased.

In a fifteenth aspect based on the first aspect, the virtual camera setting means, when an object exists in a space to be displayed on the screen of the display device or the region in which the image of the virtual space is displayed on the screen, in the virtual space, determines the position and the angle of view of the virtual camera with reference to a position of the object.

Thus, according to the fifteenth aspect, the virtual camera can be placed, in the virtual space, at a position that is located the distance between the user and the television in the real space away from the position of the object. Thereby, a less unnatural image can be provided.

In the sixteenth aspect based on the first aspect, the virtual camera setting means, when a plurality of objects exist in a space to be displayed on the screen of the display device or the region in which the image of the virtual space is displayed on the screen, in the virtual space, determines the position and the angle of view of the virtual camera with reference to a position of an object closest to the virtual camera.

Thus, according to the sixteenth aspect, a less unnatural and highly realistic image can be displayed as if the virtual space actually existed immediately behind the screen of the display device.

A seventeenth aspect of certain example embodiments is directed to an image processing apparatus for outputting an image of a virtual space captured by a virtual camera to a display device (2) including a displayed region size obtaining means (10), a distance obtaining means (10), and a virtual camera setting means (10). The displayed region size obtaining means obtains displayed region size data indicating a size of a screen of the display device, or a size of a region in which the image of the virtual space is displayed on the screen. The distance obtaining means obtains distance data indicating a distance between a user and the display device. The virtual camera setting means sets a position and an angle of view of the virtual camera in the virtual space based on the displayed region size data and the distance data.

Thus, according to the seventeenth aspect, an effect similar to that of the first aspect can be obtained.

Thus, according to certain example embodiments, a less unnatural and highly realistic image of the virtual space as viewed from the user can be displayed, thereby making it possible to substantially prevent the user from feeling that something is wrong.

These and other objects, features, aspects and advantages of certain example embodiments will become more apparent from the following description when taken in conjunction with the accompanying drawings.

BRIEF DESCRIPTION OF THE DRAWINGS

FIG. 3 is a perspective view showing a controller 7 of FIG. 1 as viewed from the top and the rear;

FIG. 4 is a perspective view showing the controller 7 of FIG. 3 as viewed from the bottom and the front;

FIGS. 15A and 15B are diagrams for describing a process in step S5 of FIG. 13;

DESCRIPTION

Hereinafter, example embodiments will be described with reference to the accompanying drawings. Note that the present invention is not limited to these examples.

(Whole Configuration of Game System)

Figure 1:
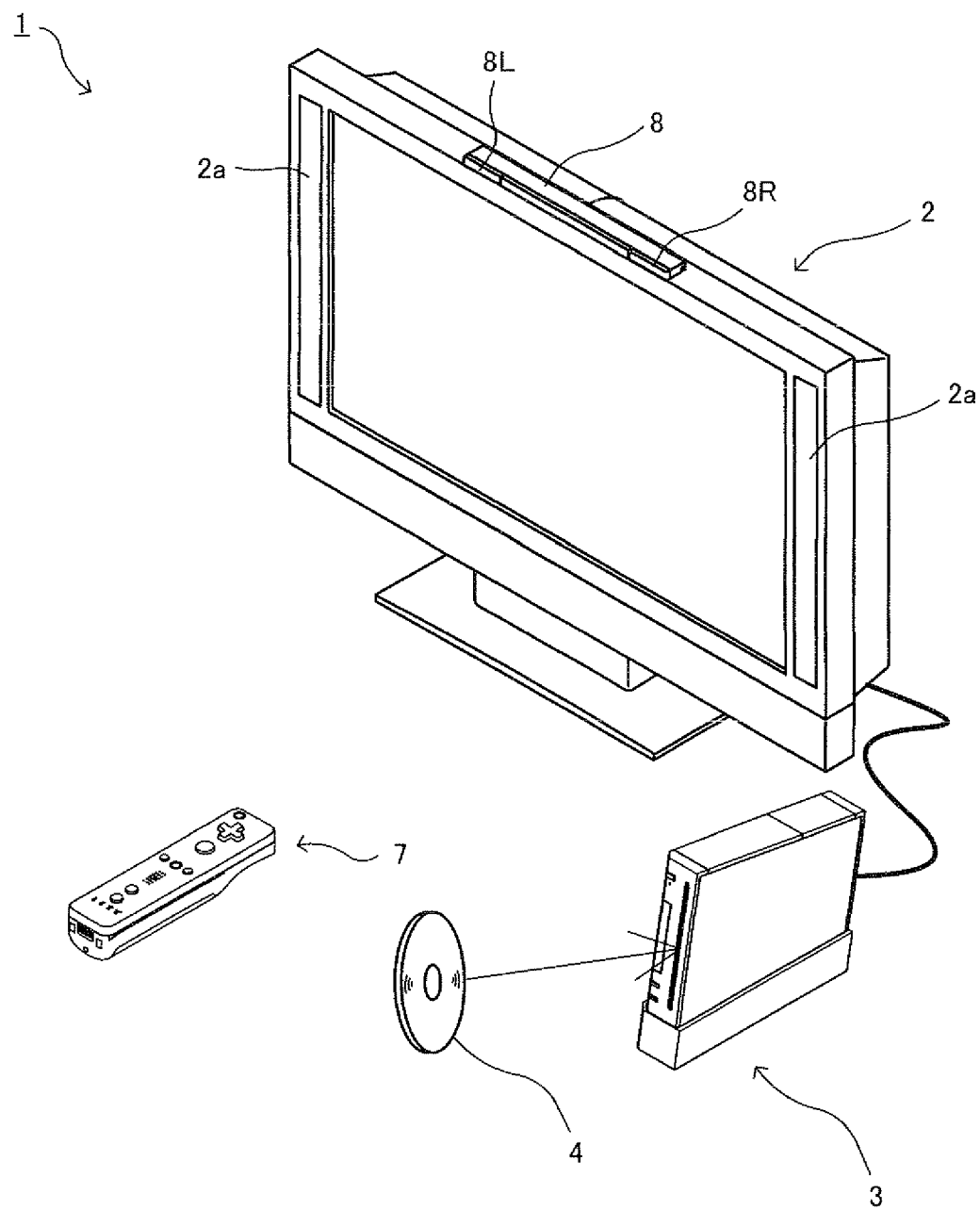
FIG. 1 is an external view of a game system 1 according to an embodiment.

A game system 1 including a game apparatus according to an embodiment will be described with reference to FIG. 1. FIG. 1 is an external view of the game system 1. Hereinafter, the game apparatus of this embodiment and a game program will be described, where the game apparatus is a stationary game apparatus as an example. In FIG. 1, the game system 1 includes a television set (hereinafter simply referred to as a "television") 2, the game apparatus main body 3, an optical disc 4, a controller 7, and a marker unit 8. In the game system 1, the game apparatus main body 3 executes a game process based on a game operation using the controller 7.

The optical disc 4, which is an exemplary information storing medium changeable with respect to the game apparatus main body 3, is detachably loaded into the game apparatus main body 3. A game program that is executed in the game apparatus main body 3 is stored on the optical disc 4. On a front surface of the game apparatus main body 3, a slot through which the optical disc 4 is inserted is provided. The game apparatus main body 3 executes a game process by reading and executing the game program stored on the optical disc 4 which has been inserted into the slot.

The television 2 as an exemplary display device is connected via a connection cord to the game apparatus main body 3. The television 2 displays a game image that is obtained as a result of the game process executed in the game apparatus main body 3. The maker unit 8 is provided in the vicinity of the screen of the television 2 (on an upper side of the screen in FIG. 1). The maker unit 8 comprises two markers 8R and 8L at both ends thereof. Specifically, the marker 8R is one or more infrared LEDs that output infrared light toward the front of the television 2 (the same is true of the marker 8L). The maker unit 8 is connected to the game apparatus main body 3, so that the game apparatus main body 3 can control ON/OFF of each infrared LED included in the maker unit 8.

The controller 7 is an input device which inputs operation data indicating an operation performed with respect to the controller 7, to the game apparatus main body 3. The controller 7 and the game apparatus main body 3 are connected via wireless communication. In this embodiment, for example, the Bluetooth(R) technology is used for wireless communication between the controller 7 and the game apparatus main body 3. Note that, in another embodiment, the controller 7 and the game apparatus main body 3 may be connected via wired communication.

(Internal Configuration of Game Apparatus Main Body 3)

Figure 2:
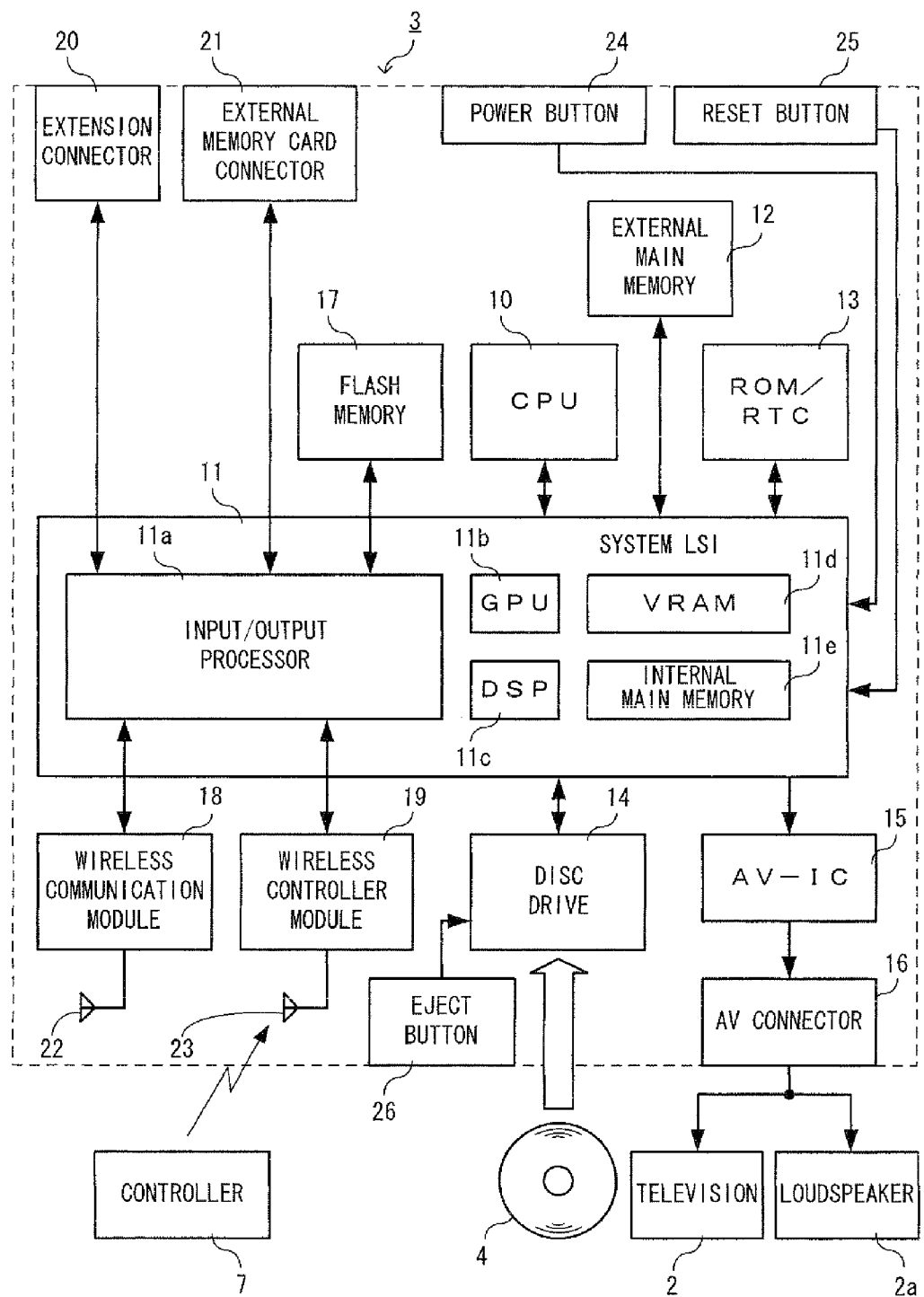
FIG. 2 is a functional block diagram of a game apparatus main body 3.

Next, an internal configuration of the game apparatus main body 3 will be described with reference to FIG. 2. FIG. 2 is a block diagram showing the configuration of the game apparatus main body 3. The game apparatus main body 3 has a CPU 10, a system LSI 11, an external main memory 12, a ROM/RTC 13, a disc drive 14, an AV-IC 15, and the like.

The CPU 10 executes a game program stored on the optical disc 4 to perform a game process, i.e., functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes, such as controlling data transfer between each part connected thereto, generating an image to be displayed, obtaining data from an external apparatus, and the like. An internal configuration of the system LSI 11 will be described below. The volatile external main memory 12 stores a program, such as a game program read out from the optical disc 4, a game program read out from a flash memory 17, or the like, or various kinds of data, and is used as a work area or a buffer area for the CPU 10. The ROM/RTC 13 has a ROM (so-called boot ROM) which stores a program for booting the game apparatus main body 3, and a clock circuit (RTC: Real Time Clock) which counts time. The disc drive 14 reads out program data, texture data or the like from the optical disc 4, and writes the read data into an internal main memory 11e (described below) or the external main memory 12.

The system LSI 11 also includes an input/output processor 11a, a GPU (Graphics Processor Unit) 11b, a DSP (Digital Signal Processor) 11c, a VRAM 11d, and the internal main memory 11e. The parts 11a to 11e are connected with each other via an internal bus (not shown).

The GPU 11b, which is a part of a drawing means, generates an image in accordance with a graphics command (image drawing command) from the CPU 10. More specifically, the GPU 11b performs a calculation process required to display 3D graphics, such as coordinate conversion from 3D coordinates to 2D coordinates (preprocess before rendering) or the like, and a final rendering process, such as attaching texture or the like, in accordance with the graphics command, to generate game image data. Here, the CPU 10 inputs, to the GPU 11b, an image generating program required to generate game image data in addition to the graphics command. The VRAM 11d stores data (e.g., polygon data, texture data, etc.) which is required by the GPU 11b to execute the graphics command. When an image is generated, the GPU 11b generates image data using data stored in the VRAM 11d.

The DSP 11c, which functions as an audio processor, generates audio data using sound data or sound waveform (tone color) data stored in the internal main memory 11e or the external main memory 12. The internal main memory 11e also stores a program or various data as with the external main memory 12, i.e., is also used as a work area or a buffer area for the CPU 10.

The image data and audio data thus generated are read out by the AV-IC 15. The AV-IC 15 outputs the read image data via an AV connector 16 to the television 2, and the read audio data to a loudspeaker 2a included in the television 2. Thereby, an image is displayed on the television 2 while a sound is output from the loudspeaker 2a.

The input/output processor (I/O processor) 11a executes data transmission and reception between parts connected thereto, or downloads data from an external apparatus. The input/output processor 11a is connected to the flash memory 17, a wireless communications module 18, a wireless controller module 19, an extension connector 20, and an external memory card connector 21. An antenna 22 is connected to the wireless communications module 18, and an antenna 23 is connected to the wireless controller module 19.

The input/output processor 11a is connected via the wireless communications module 18 and the antenna 22 to a network, and can communicate with other game apparatuses or various servers connected to the network. The input/output processor 11a regularly accesses the flash memory 17 to detect the presence or absence of data that needs to be transmitted to the network. In the case of the presence of the data, the input/output processor 11a transmits the data via the wireless communications module 18 and the antenna 22 to the network. The input/output processor 11a also receives data transmitted from other game apparatuses or data downloaded from a download server via the network, the antenna 22, and the wireless communications module 18, and stores the received data into the flash memory 17. The CPU 10 executes a game program to read out the data stored in the flash memory 17 and utilizes the data in the game program. In addition to data communicated between the game apparatus main body 3 and other game apparatuses or various servers, save data (result data or intermediate data of a game) of a game played using the game apparatus main body 3 may be stored into the flash memory 17.

The input/output processor 11a also receives, via the antenna 23 and the wireless controller module 19, operation data transmitted from the controller 7, and stores (temporarily stores) the operation data into a buffer area of the internal main memory 11e or the external main memory 12.

Also, the extension connector 20 and the external memory card connector 21 are connected to the input/output processor 11a. The extension connector 20 is a connector for interface, such as USB or SCSI. When a medium (e.g., an external storage medium, etc.), a peripheral device (e.g., another controller, etc.), or a wired communications connector is connected to the extension connector 20, communication with a network can be performed without using the wireless communications module 18. The external memory card connector 21 is a connector for connecting an external storage medium, such as a memory card or the like. For example, the input/output processor 11a can access an external storage medium via the extension connector 20 or the external memory card connector 21 to save data or read out data.

The game apparatus main body 3 is provided with a power button 24, a reset button 25, and an eject button 26. The power button 24 and the reset button 25 are connected to the system LSI 11. When the power button 24 is turned ON, power is supplied via an AC adaptor (not shown) to each part of the game apparatus main body 3. Also, if the power button 24 is pressed again while the power supply is ON, the game apparatus main body 3 is transitioned to a low-power standby mode. Even in this state, the game apparatus main body 3 is energized, so that the game apparatus main body 3 can always be connected to a network, such as the Internet or the like. Note that the power supply which is currently ON can be turned OFF by pressing the power button 24 for a predetermined time or more. When the reset button 25 is pressed, the system LSI 11 reboots the boot program of the game apparatus main body 3. The eject button 26 is connected to the disc drive 14. When the eject button 26 is pressed, the optical disc 4 is ejected from the disc drive 14.

Next, the controller 7 will be described with reference to FIGS. 3 and 4. FIG. 3 is a perspective view of the controller 7 as viewed from the top and the rear. FIG. 4 is a perspective view of the controller 7 as viewed from the bottom and the front.

In FIGS. 3 and 4, the controller 7 has a housing 71, and an operation section 72 comprising a plurality of operation buttons provided on a surface of the housing 71. The housing 71 of this example is in the shape of substantially a rectangular parallelepiped where a front-to-rear direction thereof is a longitudinal direction thereof. The whole housing 71 has a size which allows an adult and a child to hold the controller 7 with one hand. The housing 71 is formed by, for example, plastic molding.

A cross key 72a is provided on a central portion closer to a front surface of an upper surface of the housing 71. The cross key 72a is a four-direction push switch in the shape of a cross, and has operation portions corresponding to the respective four directions (frontward, rearward, leftward, and rightward), the operation portions being provided at the respective projecting pieces of the cross which are arranged at intervals of 90°. Any one of the frontward, rearward, leftward and rightward directions is selected by a player pushing down a corresponding one of the operation portions of the cross key 72a. For example, by a player operating the cross key 72a, a movement direction of a player character or the like appearing in a virtual game world can be designated, or one can be selected and designated from a plurality of options.

Note that the cross key 72a is an operation section which outputs an operation signal, depending on the aforementioned direction input operation by a player, or may be an operation section of other embodiments. For example, an operation section may be provided in which four push switches are disposed in cross directions, and an operation signal is output, depending on a push switch pushed down by the player. In addition to the four push switches, a center switch may be provided at an intersection position of the cross directions, i.e., a complex operation section comprising the four push switches and the center switch may be provided. Also, instead of the cross key 72a, an operation section may be provided which outputs an operation signal, depending on a tilt direction of a tiltable stick (so-called joystick) which projects from the upper surface of the housing 71. Also, instead of the cross key 72a, an operation section may be provided which outputs an operation signal, depending on a slide direction of an disc-like member which can be moved in a horizontal direction. Also, a touch pad may be provided instead of the cross key 72a.

A plurality of operation buttons 72b to 72g are provided at the rear of the cross key 72a on the upper surface of the housing 71. The operation buttons 72b to 72g are operation sections which output operation signals assigned to the respective operation buttons 72b to 72g when a player pushes down the head portions of the respective buttons. For example, functions of a 1st button, a 2nd button, an A button, and the like are assigned to the operation buttons 72b to 72d. Functions of a minus switch, a home switch, a plus button, and the like are assigned to the operation buttons 72e to 72g. The operation buttons 72a to 72g are assigned the respective functions, depending on a game program executed by the game apparatus main body 3. Note that, in the exemplary arrangement of FIG. 3, the operation buttons 72b to 72d are aligned on a central portion in a front-to-rear direction of the upper surface of the housing 71. The operation buttons 72e to 72g are aligned in a lateral direction on the upper surface of the housing 71 and between the operation buttons 72b and 72d. The operation button 72f is a button of a type whose upper surface is buried below the upper surface of the housing 71 so that the player is prevented from unintentionally and erroneously pushing down the button.

Also, an operation button 72h is provided at the front of the cross key 72a on the upper surface of the housing 71. The operation button 72h is a power supply switch which remotely switches ON/OFF a power supply for the game apparatus main body 3. The operation button 72h is also a button of the type whose upper surface is buried below the upper surface of the housing 71 so that a player is prevented from unintentionally and erroneously pushing down the button.

A plurality of LEDs 702 are provided at the rear of the operation button 72c on the upper surface of the housing 71. Here, the controller 7 is assigned controller identification (number) so as to distinguish it from other controllers 7. For example, the LEDs 702 are used so as to notify a player of controller identification currently set for the controller 7. Specifically, when transmission data is transmitted from the controller 7 to the game apparatus main body 3, one of the LEDs 702 is turned ON, depending on the controller identification.

Also, sound holes through which sound is emitted from a loudspeaker (a loudspeaker 706 of FIG. 5) described below to the outside are formed between the operation button 72b and the operation buttons 72e to 72g on the upper surface of the housing 71.

On the other hand, a hollow portion is formed on a lower surface of the housing 71. The hollow portion on the lower surface of the housing 71 is formed at a position where the index finger or the middle finger of a player is placed when the player holds the controller 7 with one hand while directing the front surface of the controller 7 toward the markers 8L and 8R. An operation button 72i is provided on a slope surface of the hollow portion. The operation button 72i is an operation section which functions as, for example, a B button.

An image capturing device 743 which is a part of the image capture information computing section 74 is provided on a front surface of the housing 71. Here, the image capture information computing section 74 is a system for analyzing image data captured by the controller 7 to determine a place having a high luminance in the image data and detect a center-of-gravity position, a size or the like of the place. The image capture information computing section 74 has, for example, a maximum sampling cycle of about 200 frames/sec, and therefore, can track and analyze relatively high-speed movement of the controller 7. A detailed structure of the image capture information computing section 74 will be described below. A connector 73 is provided on a rear surface of the housing 71. The connector 73 is, for example, an edge connector which is utilized so as to engage and connect the controller 7 with a connection cable.

Here, in order to specifically describe certain example embodiments, a coordinate system which is set with respect to the controller 7 is defined as follows. As illustrated in FIGS. 3 and 4, X, Y and Z axes, which are orthogonal to each other, are defined with respect to the controller 7. Specifically, a front-to-rear direction of the controller 7 (the longitudinal direction of the housing 71) is assumed to be the Z axis, and a front surface (a surface on which the image capture information computing section 74 is provided) direction of the controller 7 is assumed to be the positive direction of the Z axis. A vertical direction of the controller 7 is assumed to be the Y axis, and a lower surface (a surface on which the operation button 72i is provided) direction of the housing 71 is assumed to be the positive direction of the Y axis. A lateral direction of the controller 7 is assumed to be the X axis, and a left side surface (a side surface illustrated in FIG. 4, but not in FIG. 3) direction of the housing 71 is assumed to be the positive direction of the X axis.

Figure 5:
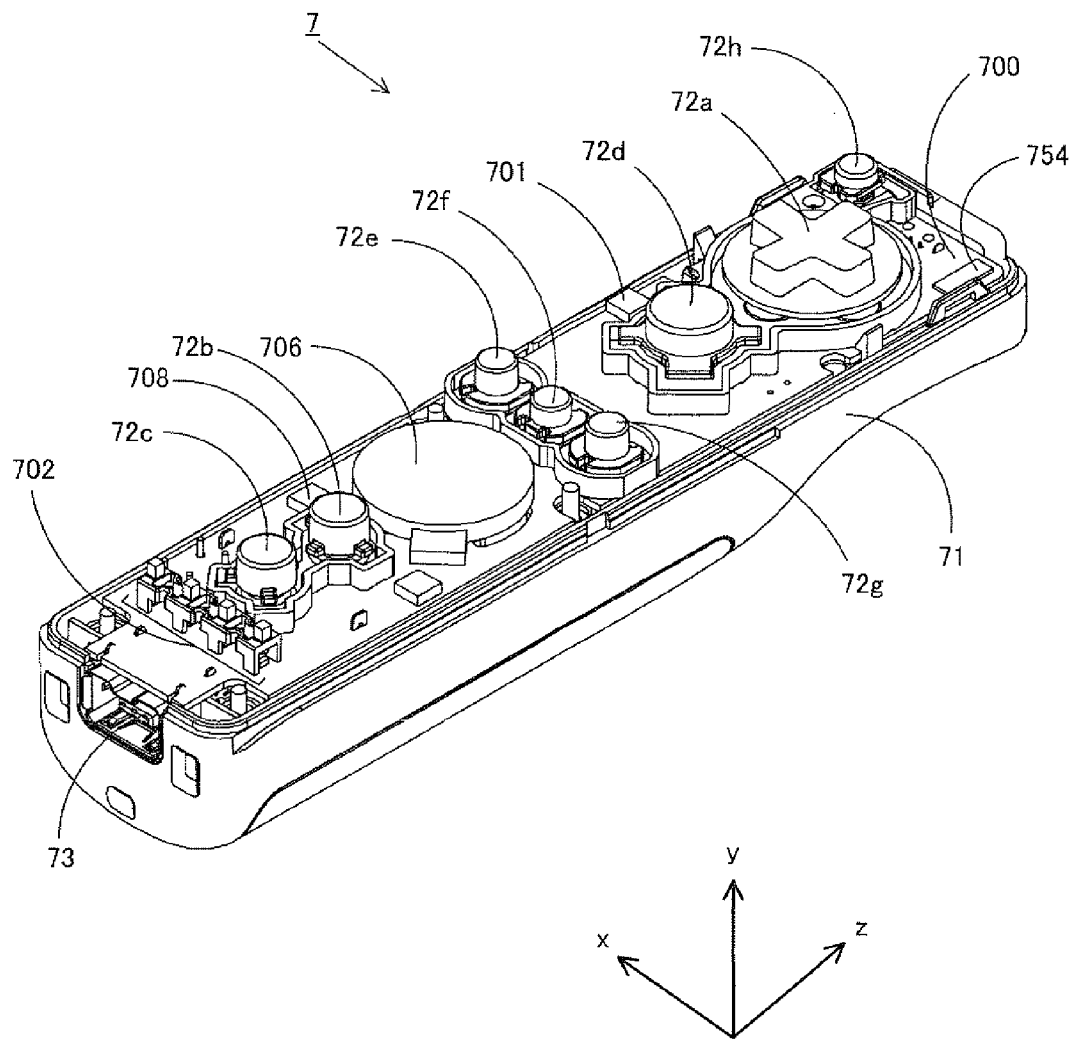
FIG. 5 is a perspective view of the controller 7 of FIG. 3 where an upper housing thereof is cut away.
Figure 6:
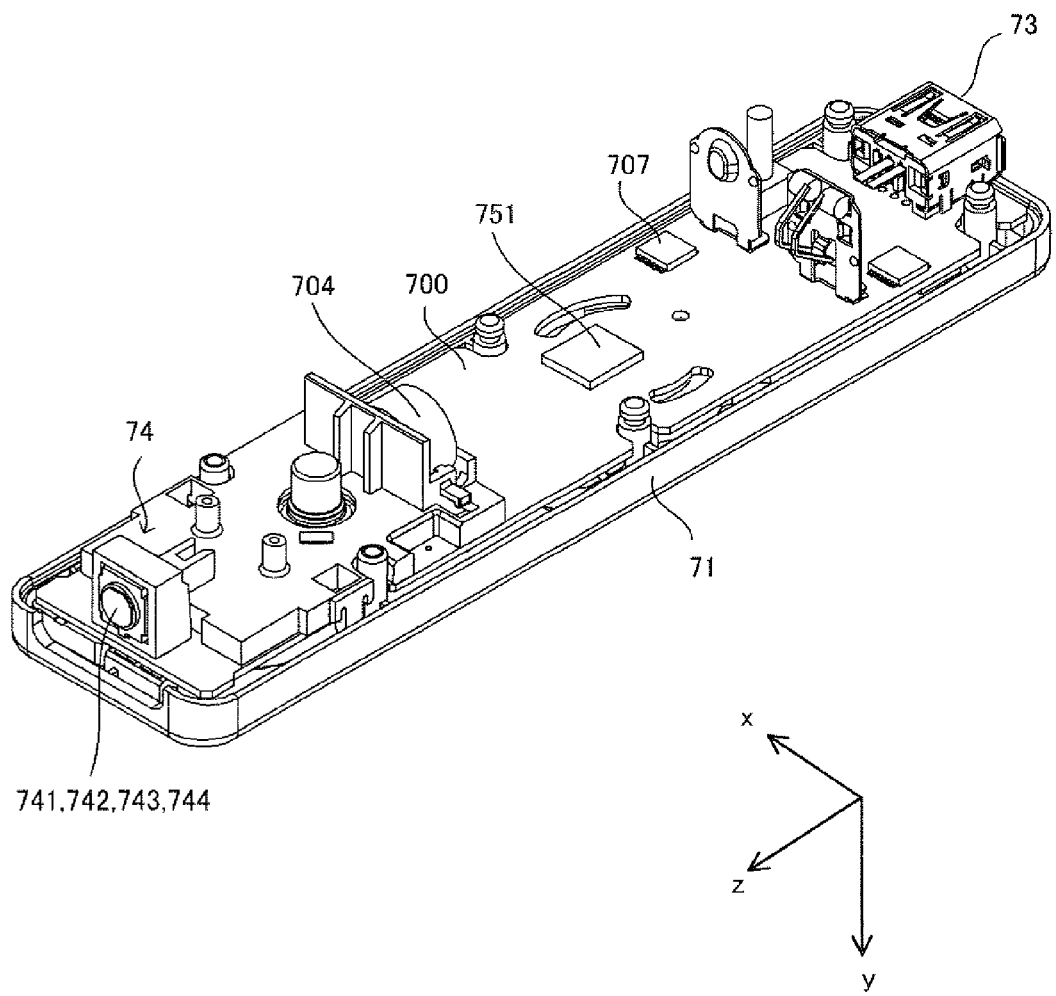
FIG. 6 is a perspective view of the controller 7 of FIG. 3 where a lower housing thereof is cut away.

Next, an internal structure of the controller 7 will be described with reference to FIGS. 5 and 6. Note that FIG. 5 is a perspective view of the controller 7 (as viewed from a rear surface side thereof) where an upper housing (a portion of the housing 71) is cut away. FIG. 6 is a perspective view of the controller 7 as viewed from the front surface side thereof where a lower housing (a portion of the housing 71) is cut away. FIG. 6 illustrates a perspective view of a base board 700 of FIG. 5 as viewed from a bottom surface thereof.

In FIG. 5, the base board 700 is fixed inside the housing 71. On an upper major surface of the base board 700, the operation buttons 72a to 72h, an acceleration sensor 701, the LEDs 702, an antenna 754, and the like are provided. These are connected to a microcomputer 751 (see FIGS. 6 and 7) via conductors (not shown) formed on the base board 700 and the like. The microcomputer 751 functions to generate operation button data, depending on the operation button 72*a* or the like, as an exemplary button data generating means of certain example embodiments. This mechanism, which is a known technique, is implemented, for example, by the microcomputer 751 detecting contact/disconnection of a conductor by a switching mechanism, such as a tactile switch or the like, which is provided under a key top. More specifically, for example, when an operation button is pushed down to contact a conductor, a current flows. The microcomputer 751 detects the current flow to determine which operation button has been pushed down, and generates a signal, depending on the operation button.

Also, by a radio module 753 (see FIG. 7) and an antenna 754, the controller 7 functions as a wireless controller. Note that a quartz oscillator (not shown) is provided in the housing 71, and generates a basic clock for the microcomputer 751 (described below). Also, the loudspeaker 706 and an amplifier 708 are provided on the upper major surface of the base board 700. Also, the acceleration sensor 701 is provided on a left side of the operation button 72*d* on the base board 700 (i.e., a peripheral portion of the base board 700, but not a center portion thereof). Therefore, the acceleration sensor 701 can detect an acceleration including a component due to a centrifugal force as well as a change in direction of a gravitational acceleration, depending on a rotation of the controller 7 around the longitudinal direction as an axis. Therefore, by predetermined computation, the game apparatus main body 3 or the like can determine the rotation of the controller 7 based on the detected acceleration data with satisfactory sensitivity.

On the other hand, in FIG. 6, the image capture information computing section 74 is provided at a front edge on a lower major surface of the base board 700. The image capture information computing section 74 comprises an infrared filter 741, a lens 742, the image capturing device 743, and an image processing circuit 744, which are arranged in this order from the front of the controller 7, and are attached to the lower major surface of the base board 700. The connector 73 is attached to a rear edge on the lower major surface of the base board 700. Also, a sound IC 707 and the microcomputer 751 are provided on the lower major surface of the base board 700. The sound IC 707 is connected to the microcomputer 751 and the amplifier 708 via conductors formed on the base board 700 and the like, and outputs an audio signal via the amplifier 708 to the loudspeaker 706, depending on sound data transmitted from the game apparatus main body 3.

A vibrator 704 is attached onto the lower major surface of the base board 700. The vibrator 704 may be, for example, a vibration motor or a solenoid. The vibrator 704 is connected to the microcomputer 751 via a conductor formed on the base board 700 and the like, and its activation is switched ON/OFF, depending on vibration data transmitted from the game apparatus main body 3. The activation of the vibrator 704 generates vibration in the controller 7, so that the vibration is transferred to a player's hand holding the controller 7, thereby making it possible to achieve a so-called vibration-feature supporting game. Here, since the vibrator 704 is disposed somehow closer to the front of the housing 71, the housing 71 significantly vibrates while the player is holding the controller 7, so that the player easily feels vibration.

Next, an internal configuration of the controller 7 will be described with reference to FIG. 7. Note that FIG. 7 is a block diagram illustrating the configuration of the controller 7.

Figure 7:
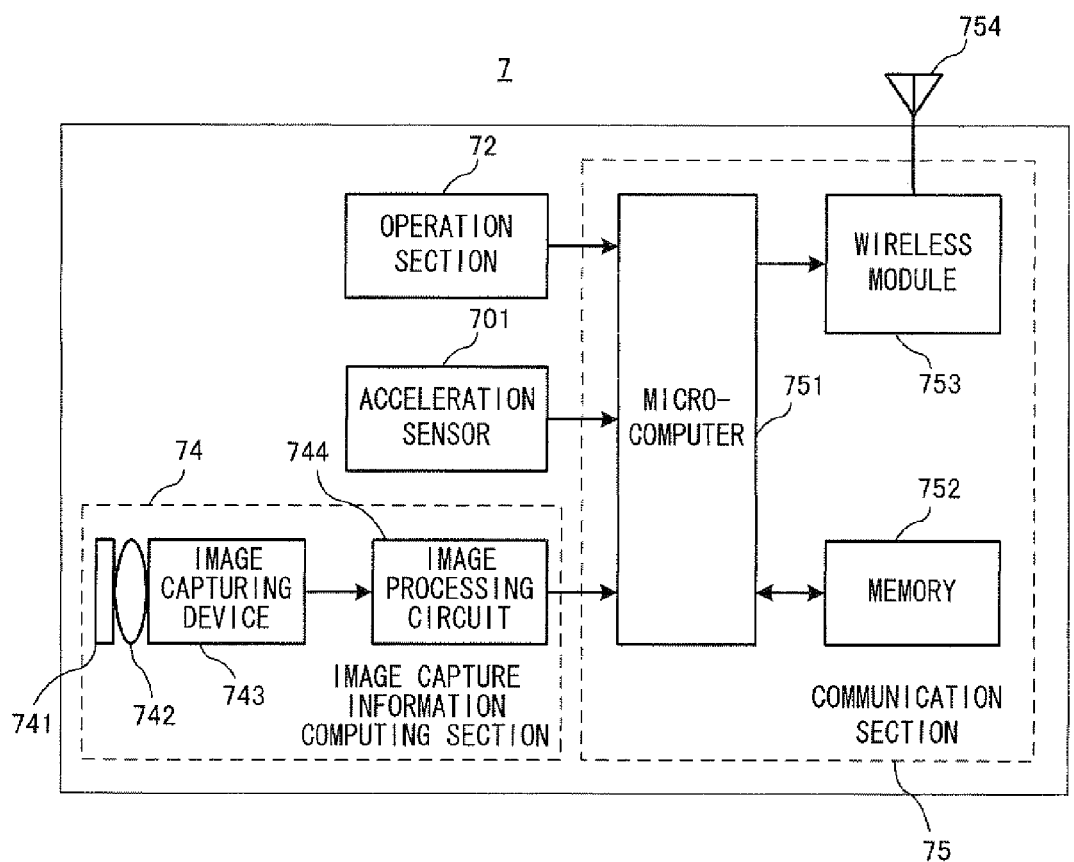
FIG. 7 is a block diagram showing a configuration of the controller 7 of FIG. 3.

In FIG. 7, the controller 7 comprises a communication section 75 in addition to the operation section 72, the image capture information computing section 74, the acceleration sensor 701, the vibrator 704, the loudspeaker 706, the sound IC 707, and the amplifier 708.

The image capture information computing section 74 includes the infrared filter 741, the lens 742, the image capturing device 743, and the image processing circuit 744. The infrared filter 741 passes only infrared light entering from the front of the controller 7. Here, the markers 8L and 8R which are provided in the vicinity of the display screen of the television 2 are infrared LEDs which emit infrared light toward the front of the television 2. Therefore, by providing the infrared filter 741, images of the markers 8L and 8R can be accurately captured. The lens 742 collects infrared light passing through the infrared filter 741 and causes the light to enter the image capturing device 743. The image capturing device 743 may be, for example, a solid-state image capturing device, such as a CMOS sensor or a CCD, and captures the infrared light collected by the lens 742. Therefore, the image capturing device 743 captures only infrared light passing through the infrared filter 741 to generate image data. An image captured by the image capturing device 743 is hereinafter referred to as a captured image. The image data generated by the image capturing device 743 is processed by the image processing circuit 744. The image processing circuit 744 calculates a position of a subject whose image is to be captured (also referred to as an "imaging subject") (the markers 8L and 8R) in the captured image. Hereinafter, a method of calculating the position of an imaging subject will be described with reference to FIG. 8.

Figure 8:
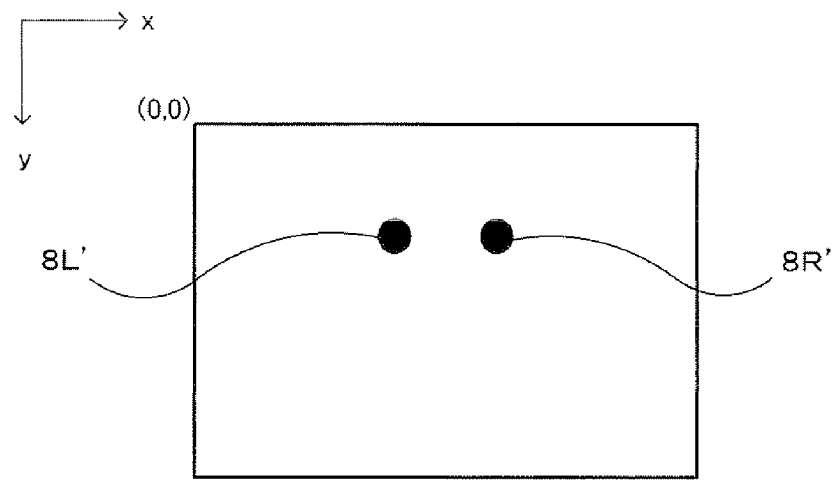
FIG. 8 is a diagram showing an exemplary captured image.

FIG. 8 is a diagram showing an exemplary captured image. In the captured image A1 of FIG. 8, an image 8L' of the marker 8L and an image 8R' of the marker 8R are laterally arranged. When receiving the captured image, the image processing circuit 744 initially calculates the coordinates of a position of each region in the captured image that matches predetermined conditions. Here, the predetermined conditions are conditions for finding an image of an imaging subject (a target image). Specifically, the predetermined conditions are such that the region has a luminance higher than or equal to a predetermined value (a high luminance region) and a size within a predetermined range. Note that any predetermined conditions that can be used to find an imaging subject may be employed. In other embodiments, the predetermined conditions may relate to the color of an image.

When a position of a target image is calculated, the image processing circuit 744 initially finds the aforementioned high luminance regions as candidates for the target image, from the entire region of a captured image. This is because a target image appears as a high illuminance region in the image data of a captured image. Next, based on a size of the high luminance region thus found, the image processing circuit 744 determines whether or not the high luminance region is the target image. The captured image may contain an image caused by sunlight through a window or light of a fluorescent tube in a room in addition to the images (target images) 8L' and 8R' of the two markers 8L and 8R. In this case, such an image may appear as a high illuminance region in addition to the images of the markers 8L and 8R. The aforementioned determination process is for distinguishing the images of the markers 8L and 8R (target images) from other images to accurately find the target images. Specifically, in the determination process, it is determined whether or not a high luminance region thus found has a size within a predetermined range. When the high luminance region has a size within the predetermined range, the high luminance region is determined to be the target image. When the size of the high luminance region is not within the predetermined range, the high luminance region is determined to be an image other than the target image.

Further, for a high luminance region which is determined to represent the target image as a result of the determination process, the image processing circuit 744 calculates a position of the high luminance region. Specifically, a position of the center of gravity of the high luminance region is calculated. Note that the position of the center of gravity can be calculated with a scale finer than the resolution of the image capturing element 743. It is here assumed that an image captured by the image capturing element 743 has a resolution of 126×96, and the position of the center of gravity can be calculated with a scale of 1024×768. In this case, the coordinates of the position of the center of gravity is represented with integer values in the range of (0, 0) to (1024, 768). Note that the position of the captured image is assumed to be represented by a coordinate system (xy coordinate system) where the upper left corner of the captured image is the origin, the downward direction is the positive direction of the y axis, and the rightward direction is the positive direction of the x axis.

As described above, the image processing circuit 744 calculates coordinates indicating a position of each region which satisfies the predetermined conditions in the captured image. Note that the coordinates calculated by the image processing circuit 744 are referred to as marker coordinates. The marker coordinates are coordinates that indicate a position of an imaging subject in the coordinate system for representing a position on a plane corresponding to the captured image. The image processing circuit 744 outputs the marker coordinates to the microcomputer 751 of the communication section 75. The data of the marker coordinates is transmitted as operation data to the game apparatus main body 3 by the microcomputer 751. Since the marker coordinates vary depending on an orientation (attitude) or a position of the controller 7 itself, the game apparatus main body 3 can calculate the orientation or the position of the controller 7. Although the processes until marker coordinates are calculated from a captured image are carried out by the image processing circuit 744 and/or the microcomputer 751 of the controller 7 in this embodiment, the captured image may be transferred to the game apparatus main body 3 and processes similar to the subsequent processes may be executed by the CPU 10 or the like of the game apparatus main body 3.

The controller 7 preferably comprises the acceleration sensor 701 which senses accelerations along with three axes (x, y and z axes). The three-axis acceleration sensor 701 senses linear accelerations in three directions, i.e., a vertical direction, a lateral direction, and a front-to-rear direction. In another embodiment, the acceleration sensor 701 may be a two-axis acceleration detecting means which senses only linear accelerations along two axes in the vertical direction and the lateral direction (or other direction pairs), depending on the type of a control signal used in a game process. For example, the three- or two-axis acceleration sensors 701 may be of a type which is available from Analog Devices, Inc. or STMicroelectronics N.V. The acceleration sensor 701 may be of a capacitance type (capacitance coupling type) based on a technique of MEMS (Micro Electro Mechanical Systems) obtained by micromachining a silicon material. However, the three- or two-axis acceleration sensor 701 may be implemented using a technique of an existing acceleration detecting means (e.g., a piezoelectric type or a piezoelectric resistance type) or other appropriate techniques which will be developed in the future.

It is known to those skilled in the art that an acceleration detecting means as used in the acceleration sensor 701 can sense only an acceleration (linear acceleration) along a straight line corresponding to each axis of the acceleration sensor 701. In other words, a direct output from the acceleration sensor 701 is a signal indicating a linear acceleration (static or dynamic) along each of the two or three axes. Therefore, the acceleration sensor 701 cannot directly sense physical characteristics, such as a motion along a non-linear path (e.g., an arc, etc.), a rotation, a rotational motion, an angular displacement, a tilt, a position, an attitude, and the like.

However, it can be easily understood by those skilled in the art from the description of the present specification that, by a computer, such as a processor (e.g., the CPU 10) of the game apparatus, a processor (e.g., the microcomputer 751) of the controller 7 or the like, executing a process based on a signal relating to an acceleration output from the acceleration sensor 701, additional information about the controller 7 can be estimated or calculated (determined). For example, a process may be performed by the computer, assuming that the controller 7 having the acceleration sensor 701 is in the static state (i.e., assuming that an acceleration detected by the acceleration sensor 701 is only a gravitational acceleration). In this case, if the controller 7 is actually in the static state, it can be determined based on the detected acceleration whether or not or how much the attitude of the controller 7 is tilted with respect to the gravity direction. Specifically, if a state of the acceleration sensor 701 whose detected axis is oriented vertically downward is assumed as a reference, it can be determined whether or not the controller 7 is tilted, based on whether or not 1 G (gravitational acceleration) is applied to the acceleration sensor 701, and it can be determined how much the controller is tilted, based on the magnitude of the acceleration detected by the acceleration sensor 701. Also, in the case of a multi-axis acceleration sensor, by subjecting an acceleration signal of each axis to a process, it can be determined in more detail how much the controller 7 is tilted with respect to the gravity direction. In this case, a processor may perform a process of calculating data about a tilt angle of the controller 7 based on the output of the acceleration sensor 701. Alternatively, a process of approximately estimating the tilt may be performed based on the output of the acceleration sensor 701 without performing the process of calculating the data about the tilt angle. Thus, by using a processor in combination with the acceleration sensor 701, a tilt, an attitude or a position of the controller 7 can be determined. On the other hand, when it is assumed that the acceleration sensor 701 is in the dynamic state, an acceleration depending on a motion of the acceleration sensor 701 is detected in addition to the gravitational acceleration component. Therefore, a motion direction or the like can be determined by removing the gravitational acceleration component by a predetermined process. Specifically, when the controller 7 comprising the acceleration sensor 701 is dynamically accelerated by a user's hand, various motions and/or positions of the controller 7 can be calculated by processing an acceleration signal generated by the acceleration sensor 701. Note that, even if it is assumed that the acceleration sensor 701 is in the dynamic state, a tilt with respect to the gravity direction can be determined by removing an acceleration depending on a motion of the acceleration sensor 701 by a predetermined process. In another example, the acceleration sensor 701 may comprise a built-in signal processing device or another type of dedicated processing device for performing a desired process with respect to an acceleration signal output from a built-in acceleration detecting means before outputting a signal to the microcomputer 751. For example, if the acceleration sensor 701 detects a static acceleration (e.g., the gravitational acceleration), the built-in or dedicated processing device may convert a sensed acceleration signal into a tilt angle corresponding thereto (or another preferable parameter).

In another embodiment, as an acceleration sensor for detecting a motion of the controller 7, a gyro-sensor comprising a rotation element, a vibration element, or the like may be employed. An exemplary MEMS gyro-sensor used in this embodiment is available from Analog Devices, Inc. As is different from the acceleration sensor 701, the gyro-sensor can directly sense a rotation (or an angular velocity) about an axis of at least one gyro-element included therein. Thus, since the gyro-sensor and the acceleration sensor are basically different from each other, one of them is selected, depending on the individual application, and processes performed for output signals from these devices need to be changed as appropriate.

Specifically, when a tilt or an attitude is calculated using a gyro-sensor instead of an acceleration sensor, a significant change is required. Specifically, when a gyro-sensor is used, the value of a tilt is initialized during the start of detection. Thereafter, angular acceleration data output from the gyro-sensor is integrated. Next, the amount of a change in tilt is calculated from the initialized tilt value. In this case, the calculated tilt has a value corresponding to an angle. On the other hand, when an acceleration sensor is used to calculate a tilt, the tilt is calculated by comparing the value of a component about each axis of a gravitational acceleration with a predetermined reference. Therefore, the calculated tilt can be represented by a vector, and an absolute direction can be detected by the acceleration detecting means without initialization. Also, whereas a value calculated as a tilt is an angle when a gyro-sensor is used, the value is a vector when an acceleration sensor is used. Therefore, when a gyro-sensor is used instead of an acceleration sensor, the tilt data needs to be subjected to predetermined conversion, taking into consideration a difference between the two devices. The characteristics of gyro-sensors as well as the basic difference between the acceleration detecting means and the gyro-sensor are known to those skilled in the art, and will not be herein described in more detail. Whereas gyro-sensors have an advantage of directly sensing rotation, acceleration sensors generally have an advantage over the gyro-sensor in terms of cost effectiveness when the acceleration sensor is applied to a controller as used in this embodiment.

The communication section 75 comprises the microcomputer 751, the memory 752, the radio module 753, and the antenna 754. The microcomputer 751 controls the radio module 753 for wirelessly transmitting transmission data while using the memory 752 as a memory area during a process. Also, the microcomputer 751 controls operations of the sound IC 707 and the vibrator 704, depending on data from the game apparatus main body 3 which is received by the radio module 753 via the antenna 754. The sound IC 707 processes sound data or the like transmitted from the game apparatus main body 3 via the communication section 75. Also, the microcomputer 751 activates the vibrator 704, depending on vibration data (e.g., a signal for switching ON/OFF the vibrator 704) or the like transmitted from the game apparatus main body 3 via the communication section 75.

An operation signal (key data) from the operation section 72 provided in the controller 7, acceleration signals (x-, y- and z-axis direction acceleration data; hereinafter simply referred to as acceleration data) from the acceleration sensor 701, and process result data from the image capture information computing section 74, are output to the microcomputer 751. The microcomputer 751 temporarily stores the received data (the key data, the acceleration data, and the process result data), as transmission data to be transmitted to the wireless controller module 19, into the memory 752. Here, radio transmission from the communication section 75 to the wireless controller module 19 is performed in predetermined cycles. Since a game is generally processed in units of 1/60 sec, the cycle of the radio transmission needs to be shorter than 1/60 sec. Specifically, the game processing unit is 16.7 ms (1/60 sec), and the transmission interval of the communication section 75 employing Bluetooth(R) is 5 ms. When timing of transmission to the wireless controller module 19 arrives, the microcomputer 751 outputs transmission data stored in the memory 752, as a series of pieces of operational information, to the radio module 753. Thereafter, the radio module 753 modulates the operational information using a carrier wave having a predetermined frequency and emits the resultant radio signal from the antenna 754, by means of, for example, the Bluetooth(R) technique. Specifically, the key data from the operation section 72 provided in the controller 7, the acceleration data from the acceleration sensor 701, and the process result data from the image capture information computing section 74 are modulated into a radio signal by the radio module 753, and the radio signal is transmitted from the controller 7. Thereafter, the wireless controller module 19 of the game apparatus main body 3 receives the radio signal, and the game apparatus main body 3 demodulates or decodes the radio signal, thereby obtaining a series of pieces of operational information (the key data, the acceleration data, and the process result data). Thereafter, the CPU 10 of the game apparatus main body 3 performs a game process based on the obtained operational information and a game program. Note that, when the communication section 75 is configured using the Bluetooth(R) technique, the communication section 75 can also have a function of receiving transmission data wirelessly transmitted from other devices.

Figure 9:
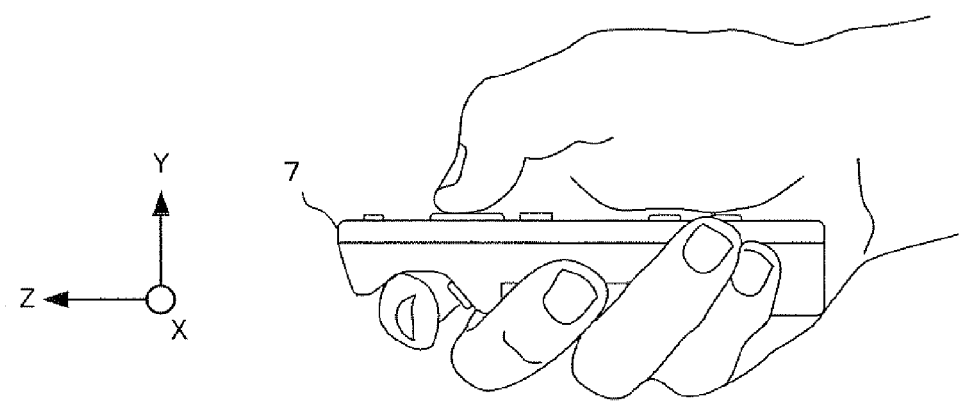
FIG. 9 is a diagram for describing a game operation using the controller 7.

Here, a game operation using the controller 7 will be described. When the controller 7 is used to play a game in the game system 1, a player holds the controller 7 with one hand. In this case, as shown in FIG. 9, the player holds the controller 7 while directing the front surface (a side through which light to be captured by the image capture information computing section 74 enters) of the controller 7 toward the markers 8L and 8R. In this state, the player performs a game operation by changing a tilt of the controller 7, a position (designated position) on the screen pointed or designated by the controller 7, or a distance between the controller 7 and each of the markers 8L and 8R.

Next, an outline of a process executed by the thus-configured game system 1 will be described. Firstly, in this embodiment, an editor game in which the player creates a 3D model is assumed. Specifically, the player uses the controller 7 to designate a desired position with respect to a sample 3D model to be displayed on the screen and perform various operations, thereby freely creating or editing the 3D model.

In this embodiment, a position and an angle of view of a virtual camera are set based on a distance between the player in a real space and the television 2. More specifically, initially, a distance between the controller 7 and the marker unit 8 (equivalent to a distance between the player and the television 2) is calculated. Thereafter, in the virtual space, the virtual camera is placed at a position that is located the calculated distance away from a 3D model whose image is to be captured. Thereafter, the angle of view of the virtual camera is determined based on the distance and a size of a displayed region of the screen in which the 3D model is to be displayed.

Figure 10A:
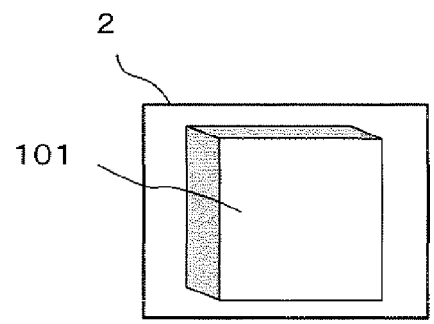
FIGS. 10A and 10B are diagrams for describing a displayed region.
Figure 10B:
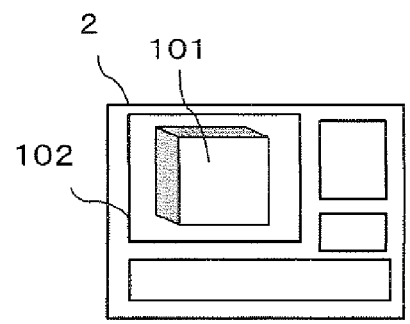

As used herein, the term "displayed region" refers to a region for displaying the 3D model in the real space (in other words, a region that is on the screen in the real space and in which a so-called rendering target is displayed). For example, when a 3D model 101 is displayed on the entire screen as shown in FIG. 10A, the entire screen of the television 2 is a displayed region, and a size (actual size) of the screen is a size of the displayed region. Alternatively, when a window-type display is utilized to provide only a partial region of the screen as a region for displaying a 3D model as shown in FIG. 10B, a window 102 is a displayed region as used herein, and a size in the real space of a partial region of the screen corresponding to a size of the window 102 (this window is displayed) is a size of the displayed region.

Figure 11A:
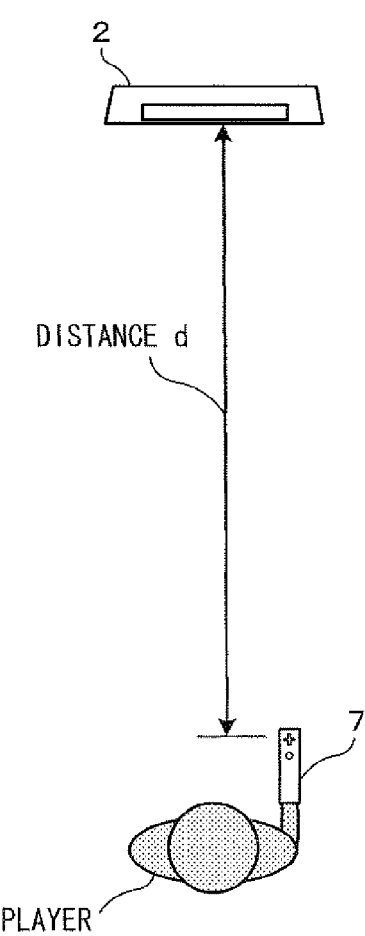
FIGS. 11A and 11B are diagrams for describing an outline of a process in the embodiment.
Figure 11B:
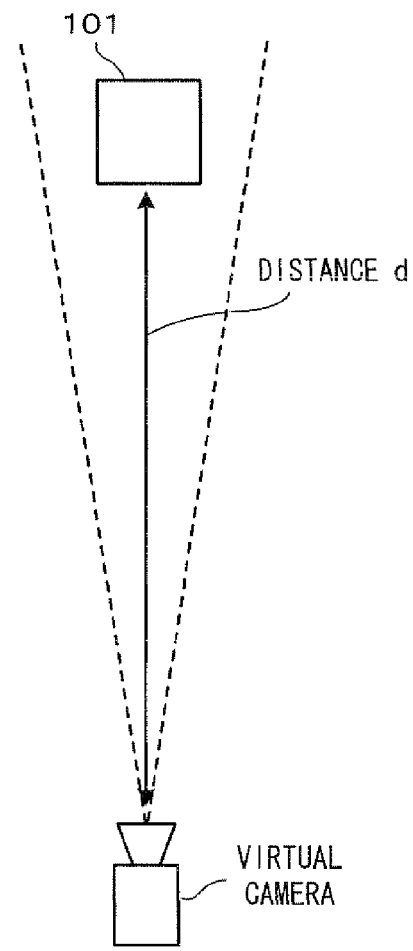

An outline of a process in this embodiment will be described, illustrating an example in which the virtual camera captures an image of the 3D model 101 (e.g., a cubic model (hereinafter referred to as a "cubic model 101"; 101 is a reference numeral)) placed in the virtual space, and the captured image is displayed on the entire screen of the television 2, assuming that the virtual space and the real space have the same scale (the ratio of a size of a cube in the real space to a size of the cubic model in the virtual space is 1:1). Initially, as shown in FIG. 11A, a distance d in the real space between the television 2 and the controller 7 is calculated. Next, as shown in FIG. 11B, in the virtual space, the virtual camera is placed at a position that is located the distance d away from the cubic model 101. For example, if the distance d between the television 2 and the controller 7 is 3 m, the virtual camera is also placed, in the virtual space, at a position that is located 3 m away from the cubic model 101 (a surface thereof facing the player). Since the real space and the virtual space have the same scale, the distance between the television 2 and the controller 7 is the same as the distance between the cubic model 101 and the virtual camera. In other words, the position of the virtual camera corresponds to the position of the player (the controller 7), and the position of the cubic model 101 corresponds to the position of the television 2.

Figure 12A:
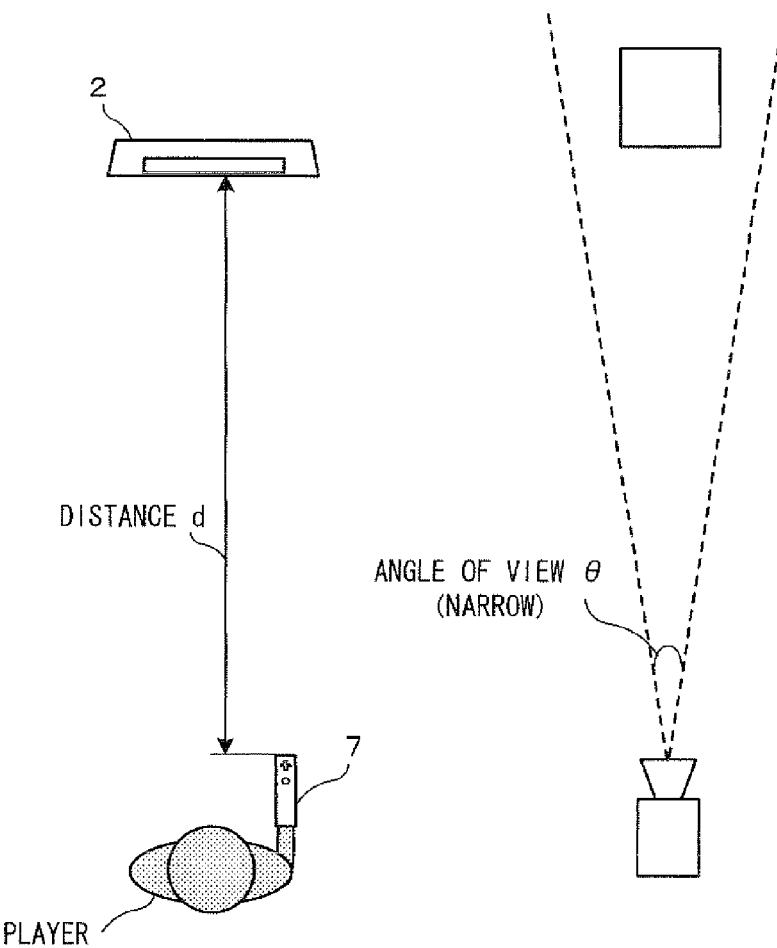
FIGS. 12A and 12B are diagrams for describing the outline of the process in the embodiment.
Figure 12B:
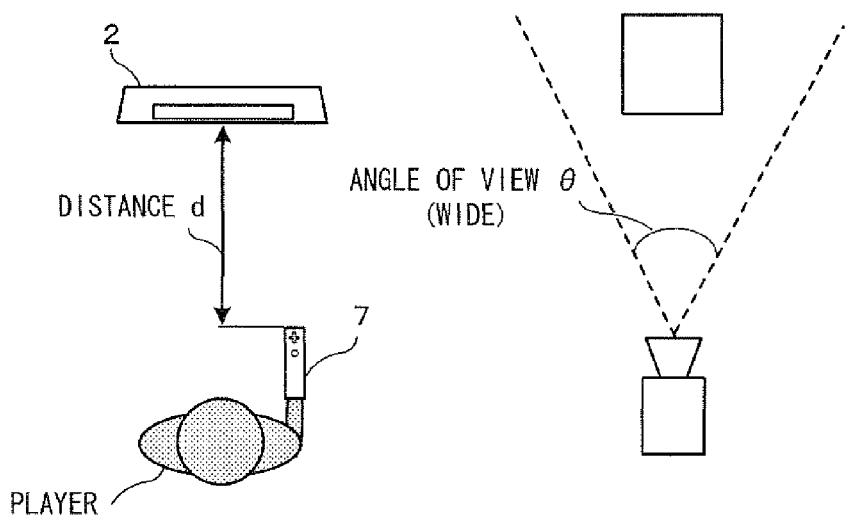

Next, the angle of view θ of the virtual camera is set, depending on the distance d and the size of the displayed region (here, the screen of the television 2). The angle of view θ is decreased with an increase in the distance d between the television 2 and the controller 7 as shown in FIG. 12A. In other words, as the distance d between the television 2 and the controller 7 is decreased as shown in FIG. 12B, the angle of view θ is increased. Specifically, as the player approaches the screen, the angle of view θ of the virtual camera is set to be wider. Conversely, as the player goes away from the screen, the angle of view θ of the virtual camera is set to be narrower.

Thus, the position and the angle of view θ of the virtual camera are set based on the distance in the real space between the player and the television 2 before an image of the cubic model 101 is captured, thereby making it possible to display a more realistic image on the screen. Specifically, the same image as that which would be seen by the player if the cubic model 101 actually existed in the television 2 (or immediately behind the screen of the television 2) in the real space, is displayed on the screen. As a result, it is possible to provide an image that does not cause the player to feel that something is wrong.

Figure 13:
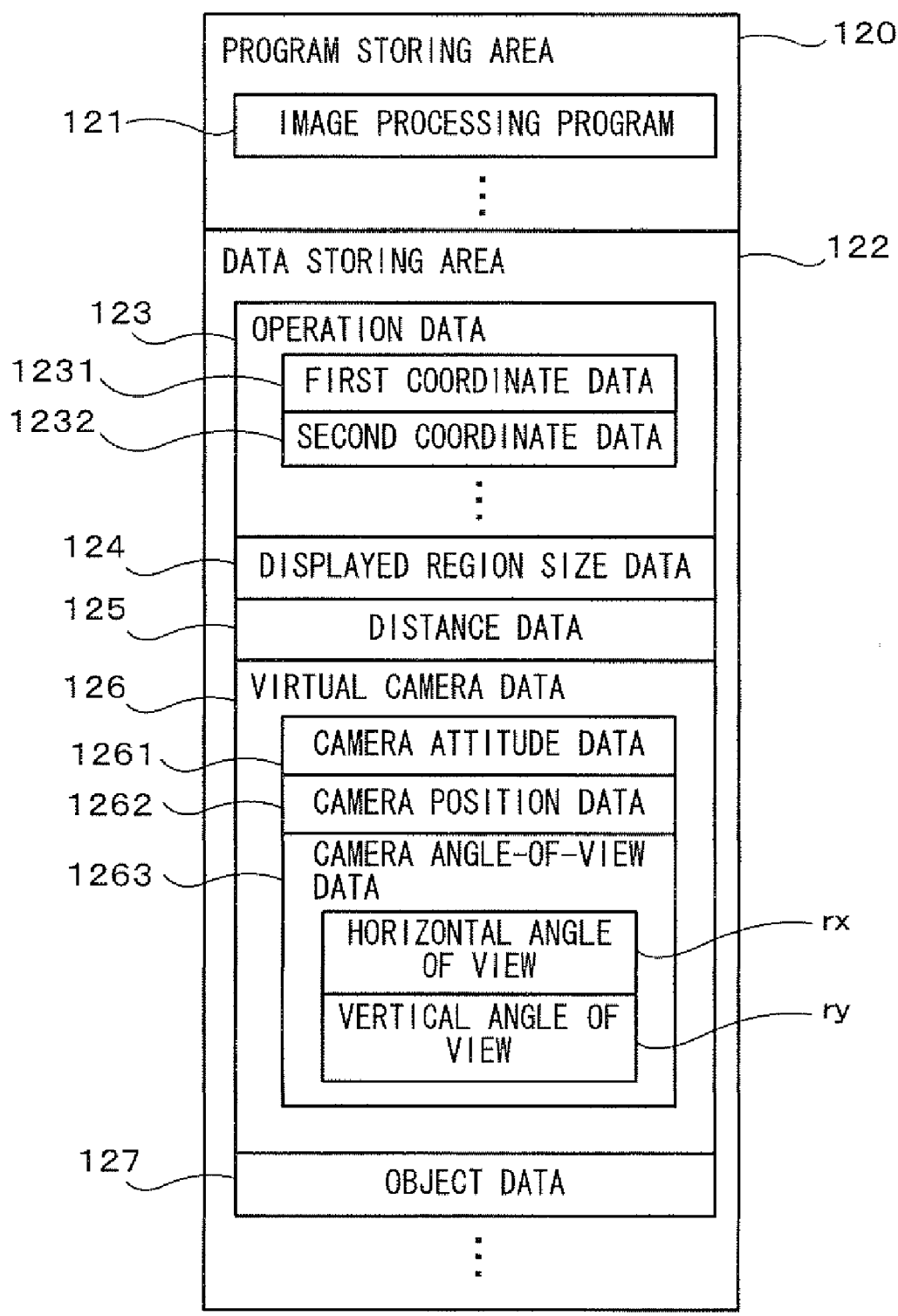
FIG. 13 is a diagram showing a memory map of a main memory 12 of the game apparatus main body 3.

Next, an image process executed by the game apparatus main body 3 will be described in detail. Firstly, data that is stored into the external main memory 12 during the image process will be described. FIG. 13 is a diagram showing a memory map of the main memory 12 of the game apparatus main body 3. In FIG. 13, the external main memory 12 includes a program storing area 120 and a data storing area 122. Data in the program storing area 120 and the data storing area 122 is stored on the optical disc 4, and is transferred to and stored into the external main memory 12 during execution of an image processing program.

The program storing area 120 stores, for example, an image processing program 121 that is executed by the CPU 10.

The data storing area 122 stores, for example, data, such as operation data 123, displayed region size data 124, distance data 125, virtual camera data 126, object data 127, and the like.

The operation data 123 is operation data that is successively transmitted from the controller 7, and is updated with the latest operation data. The operation data 123 includes first coordinate data 1231 and second coordinate data 1232. The first coordinate data 1231 is coordinate data indicating a position of one of the images of the two markers 8L and 8R with respect to the image captured by the image capturing device 743 (a position in the captured image; here, corresponding to 8L' in FIG. 8). The second coordinate data 1232 is coordinate data indicating a position of the image of the other marker (a position in the captured image; here, corresponding to 8R' in FIG. 8). For example, the positions of the marker images are represented by an XY coordinate system in the captured image.

The displayed region size data 124 is data indicating a size of a displayed region as described with reference to FIG. 10. For example, a vertical width and a horizontal width of a displayed region, which are represented in units of centimeters or the like, are stored as the displayed region size data 124. In this embodiment, data indicating the horizontal width is described as a horizontal width wx, and data indicating the vertical width is described as a vertical width wy Note that the displayed region size data 124 may be a screen size represented by a diagonal length (e.g., "32 type", "32 inch", etc.). The data may be obtained by the player previously entering a screen size of the television 2 using a "main body setting screen" of the game apparatus main body 3, for example, and may be then stored into the flash memory 17. The data may be read and transferred from the flash memory 17 to the external main memory 12 during execution of the process of this embodiment.

The distance data 125 is data indicating the distance d from the markers 8L and 8R to the controller 7, which is calculated based on the first coordinate data 1231 and the second coordinate data 1232.

The virtual camera data 126 is data indicating a position and the like of the virtual camera in the virtual space. The virtual camera data 126 includes camera attitude data 1261, camera position data 1262, and camera angle-of-view data 1263. The camera attitude data 1261 is data indicating an attitude of the virtual camera (an orientation of the virtual camera). The attitude of the virtual camera is represented by three-dimensional vectors correspond to three axes X, Y and Z (a three-dimensional vector is herein represented by <an X-axis component, a Y-axis component, a Z-axis component> (e.g., <1, 0, 1>)). Specifically, the attitude of the virtual camera is represented by a three-dimensional vector <Zx, Zy, Zz> indicating an orientation in a Z-axis direction, a three-dimensional vector <Yx, Yy, Yz> indicating an orientation in a Y-axis direction, and a three-dimensional vector <Xx, Xy, Xz> indicated an orientation in an X-axis direction (the coordinate space is assumed to be a right-handed coordinate system).

The camera position data 1262 is data indicating a position of the virtual camera in the virtual space. In this embodiment, the position of the virtual camera is represented by three-dimensional coordinates (cx, cy, cz). The camera angle-of-view data 1263 is data indicating an angle of view of the virtual camera, including a horizontal angle of view rx and a vertical angle of view ry. These values are calculated in a process described below.

The object data 127 is data indicating a 3D model placed in the virtual space. For example, the object data 127 is data indicating the cubic model 101 of FIGS. 11A and 11B.

Figure 14:
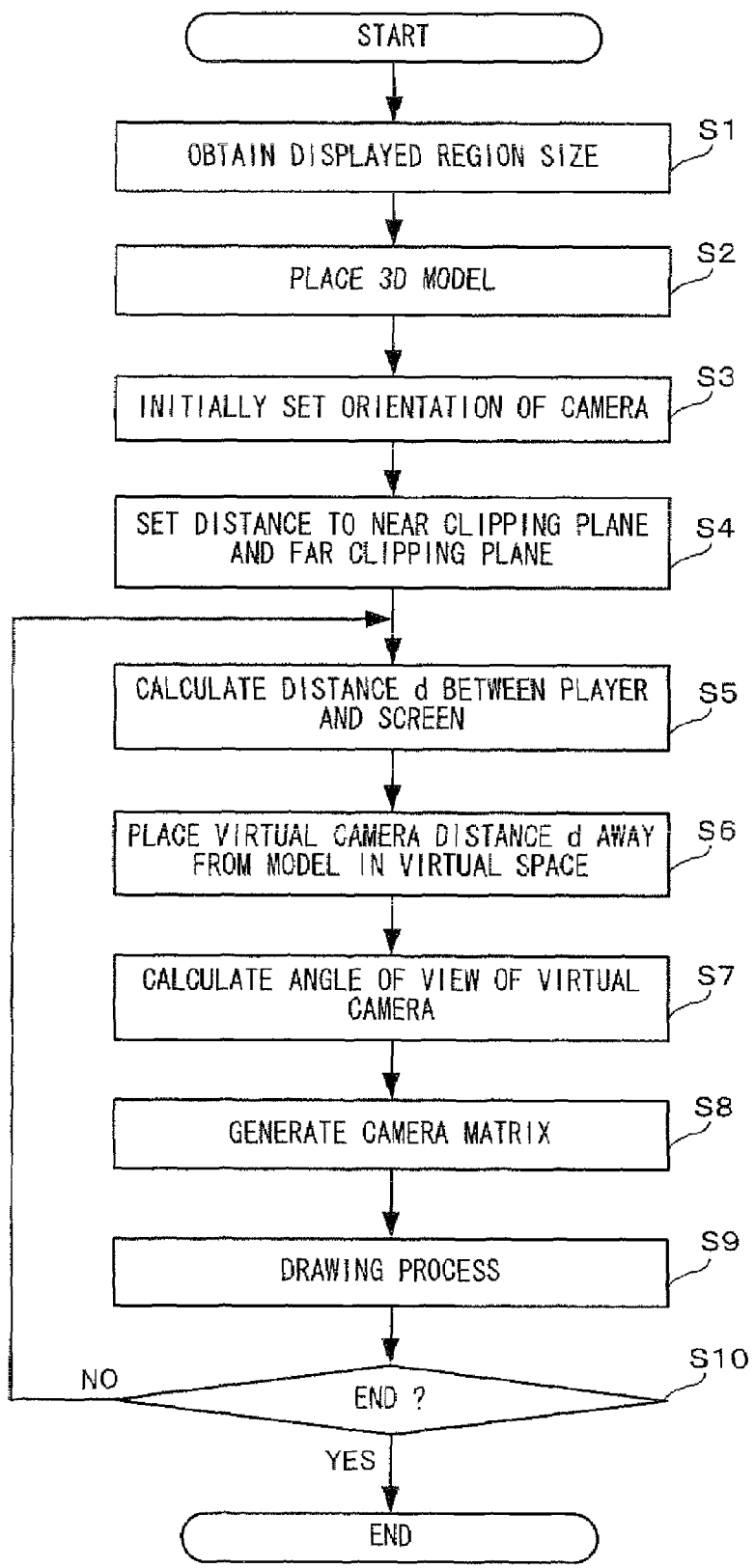
FIG. 14 is a flowchart showing an image process executed by the game apparatus main body 3 in detail.

Next, an image process executed by the game apparatus main body 3 will be described with reference to FIGS. 14 to 16. Note that FIG. 14 is a flowchart showing the image process executed by the game apparatus main body 3 in detail. Note that, in the flowchart of FIG. 14, a process of setting the virtual camera that is performed by executing the image processing program will be mainly described, and other processes that do not directly relate to certain example embodiments will not be described in detail.

In FIG. 14, initially, the CPU 10 obtains data indicating the size of a displayed region (step S1). Specifically, the displayed region size data 124 is read out from the external main memory 12 to obtain preset data, i.e., the horizontal width wx and the vertical width wy. Note that when the displayed region size is not previously set, the CPU 10 may display a predetermined input screen to prompt the player to input a screen size. When the displayed region size data 124 is represented by a diagonal length, such as "32 type", "32 inch" or the like, the horizontal width wx and the vertical width wy may be calculated from the diagonal length. It is here assumed that the unit of the size is set to be centimeter. Here, the unit indicating the displayed region size is preferably the same as the unit of the distance d described below. Therefore, the distance d described below is also assumed to be represented in units of centimeters.

Next, the CPU 10 reads out the object data 127 from the external main memory 12 and generates a 3D model based on the data. Thereafter, the CPU 10 places the generated 3D model at a predetermined position in the virtual space (step S2). Hereinafter, the position (three-dimensional coordinate point) where the 3D model is placed is represented by (ax, ay, az).

Next, the CPU 10 sets an attitude of the virtual camera (an orientation of the virtual camera) (step S3). The attitude may be any attitude. Here, as an example, the CPU 10 sets the camera attitude data 1261 so that the shooting direction of the virtual camera is set to be a front direction. Specifically, the three-dimensional vector <Zx, Zy, Zz> indicating the Z-axis orientation is set to be <0, 0, 1>, the three-dimensional vector <Yx, Yy, Yz> indicating the Y-axis orientation is set to be <0, 1, 0>, and the three-dimensional vector <Xx, Xy, Xz> indicating the X-axis orientation is set to be <1, 0, 0>. That is, the length of each vector is 1.

Next, the CPU 10 sets a distance n from the virtual camera to a near clipping plane and a distance f from the virtual camera to a far clipping plane (step S4). These distances are set to have sufficient values that cause the 3D model placed in step S2 to be included within a view volume.

Next, the CPU 10 calculates the distance d between the controller 7 and the markers 8L and 8R based on the first coordinate data 1231 and the second coordinate data 1232 that have been transmitted from the controller 7 and stored in the external main memory 12 (step S5). The process of step S5 will be described in more detail. Initially, the CPU 10 obtains the first coordinate data 1231 and the second coordinate data 1232, and calculates a distance mi between two points. As shown in FIG. 15A, the two-point distance mi is a distance between two points in a captured image. The two points correspond to the captured images (8L' and 8R') of the markers 8L and 8R, and their coordinates have been obtained as the first coordinate data 1231 and the second coordinate data 1232. Therefore, the CPU 10 can calculate the two-point distance mi using the first coordinate data 1231 and the second coordinate data 1232. Specifically, the two-point distance mi is calculated by:

$$mi = \sqrt{(Rx-Lx)^2 + (Ry-Ly)^2}$$

where the first coordinate data 1231 is assumed to be position coordinates (Lx, Ly), and the second coordinate data 1232 is assumed to be position coordinates (Rx, Ry).

Next, the CPU 10 calculates a width w (see FIG. 15B) of a range within which the image capturing device 743 can capture images with respect of positions where the markers 8L and 8R are placed. The width w is calculated by:

$$w = wi \times m / mi$$

where m represents a spacing between the markers 8L and 8R (actual spacing; e.g., 20 cm) (m has a fixed value), and wi represents a width of an image captured by the image capturing device 743 corresponding to the width w (wi has a fixed value). Since the spacing m and the width wi each have a fixed value, they are previously stored in a memory means (e.g., the flash memory 17) in the game apparatus main body 3. Next, the CPU 10 calculates the distance d (see FIG. 15B) between the markers 8L and 8R and the image capturing device 743 (the controller 7) using the width w and the angle of view θ of the image capturing device 743, and stores the distance d into the distance data 125. Here, the distance d can be calculated by:

$$d = (w/2) / \{\tan(\theta/2)\}$$

where the angle of view θ has a fixed value, and therefore, is previously stored in the game apparatus main body 3 (e.g., the flash memory 17).

Referring back to FIG. 14, next, the CPU 10 calculates a position (cx, cy, cz) that is located the distance d from the 3D model in the virtual space, and places the virtual camera at the position (step S6). The CPU 10 also stores data indicating the position into the camera position data 1262. The position (cx, cy, cz) can be calculated by, for example, the following expression.

$$cx = ax - d \times Zx$$

$$cy = ay - d \times Zy$$

$$cz = az - d \times Zz$$

Next, the CPU 10 executes a process of calculating the angle of view of the virtual camera, i.e., the horizontal angle of view rx and the vertical angle of view ry (step S7).

The horizontal angle of view rx and the vertical angle of view ry are calculated by the following expression.

$$rx = 2 \times ATAN(wx/2/d)$$

$$ry = 2 \times ATAN(wy/2/d)$$

Figure 16:
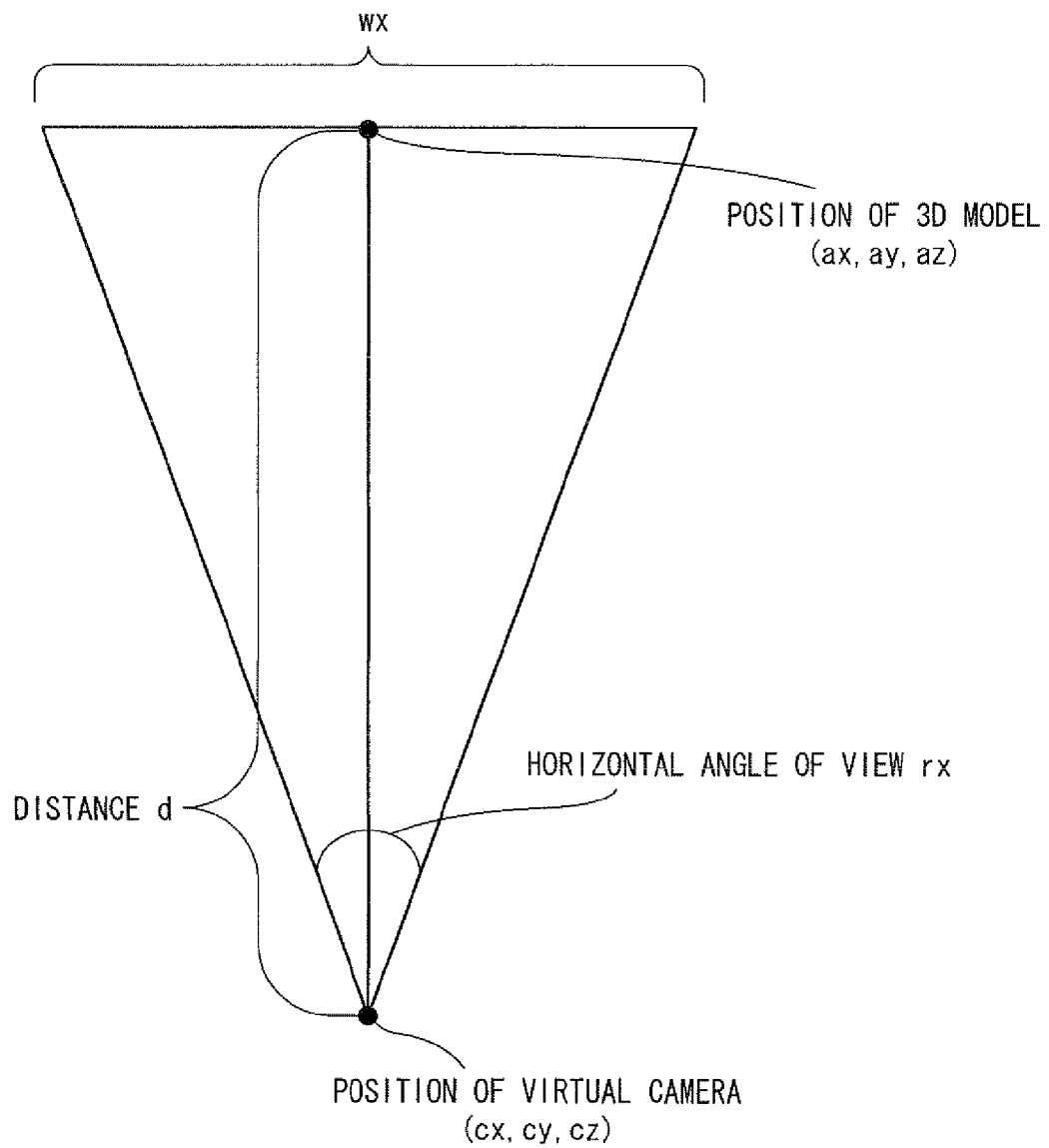
FIG. 16 is a diagram for describing a process in step S7 of FIG. 13.

FIG. 16 shows a relationship among the positions of the virtual camera and the 3D model, the distance d, and the horizontal width wx when the horizontal angle of view rx is calculated. Here, the horizontal angle of view rx is set to have a value that is increased with an increase in the horizontal width wx of the displayed region. Specifically, even when the distance d has the same value (the position of the player is the same), a television with a screen having an aspect ratio of 4:3 and a television with a screen having an aspect ratio of 16:9 have different horizontal angles of view rx, i.e., the latter has a larger angle of view rx, for example. Also, even when the aspect ratio is the same, a 19-inch television and a 32-inch television have different angles of view, i.e., the 32-inch television has a larger angle of view (the same is true of the vertical angle of view ry).

Referring back to FIG. 14, next, the CPU 10 generates a camera matrix from the camera position data 1262, the camera attitude data 1261, and the virtual camera angle-of-view data 1263 (step S8). The camera matrix includes a 3×4 view matrix for conversion into a direction in which the virtual space is viewed from the virtual camera, and a 4×4 projection matrix for projection onto a 2D screen. Specifically, the following matrix expressions are generated.

(3×4 View Matrix Expression)
m00 m01 m02 m03
m10 m11 m12 m13
m20 m21 m22 m23

$m00 = -Xx$ $m01 = -Xy$ $m02 = -Xz$ $m03 = cx \times Xx + cy \times Xy + cz \times Xz$ $m10 = Yx$ $m11 = Yy$ $m12 = Yz$ $m13 = -cx \times Yx - cy \times Yy - cz \times Yz$ $m20 = -Zx$ $m21 = -Zy$ $m22 = -Zz$ $m23 = cx \times Zx + cy \times Zy + cz \times Zz$ (4×4 Projection Matrix Expression)
m00 m01 m02 m03
m10 m11 m12 m13
m20 m21 m22 m23
m30 m31 m32 m33

$m00 = 2 \times n / (R-L)$ $m01 = 0$ $m02 = (R+L)/(R-L)$ $m03 = 0$ $m10 = 0$ $m11 = 2 \times n / (T-B)$ $m12 = (T+B)/(T-B)$ $m13 = 0$ $m20 = 0$ $m21 = 0$ $m22 = -(f+n)/(f-n)$ $m23 = -2 \times f \times n/(f-n)$ $m30 = 0$ $m31 = 0$ $m32 = -1$ $m33 = 0$ $R = wx \times (n/d) \times -0.5$ $L = wx \times (n/d) \times 0.5$ $T = wy \times (n/d) \times 0.5$ $B = wy \times (n/d) \times -0.5$ Next, the CPU 10 executes a drawing process for displaying an image of the virtual space in which the 3D model is placed (the image is captured by the virtual camera set in the aforementioned process) (step S9).

After step S9, the CPU 10 determines whether or not the process is to be ended (step S10). If the result of determination is YES, the process is ended. If the result of determination is NO, the process flow returns to step S5, and the process is repeated. Thus, the image process of this embodiment is completed.

Thus, in this embodiment, a position and an angle of view of a virtual camera are set, depending on a distance in a real space between a player and a television. An image captured by the thus-set virtual camera can provide a more realistic sensation to the player.

Note that it has been assumed in the embodiment above that the distance between the television 2 and the player is obtained by using a combination of the controller 7 with an image capturing device and the marker unit 8. It has also been assumed that the distance d is calculated based on the spacing between the markers 8L and 8R. The present invention is not limited to this. The distance d may be calculated based on a size of a captured image of the marker 8L or 8R. For example, the distance d may be calculated based on a diameter of the marker image 8L' or 8R' in a captured image (see FIG. 15A). This is because the distance d decreases with an increase in the diameter, i.e., the distance d increases with a decrease in the diameter.

Although it has been assumed above that the distance between the television 2 and the player is obtained by using a combination of the controller 7 with an image capturing device and the marker unit 8, the present invention is not limited to this. For example, the player may measure a distance between the television 2 and the player and manually enter the measured distance. The measured distance may be temporarily stored in a memory, and may be read out from the memory as required. Any method that can be used to obtain a distance between a player and a television may be employed.

Also, the process of setting the distance n to the near clipping plane and the distance f to the far clipping plane in step S4 may be executed after the virtual camera is placed in step S6. In this case, by setting the near clipping plane and the far clipping plane after placing the virtual camera, the setting can be performed more appropriately.

Figure 17A:
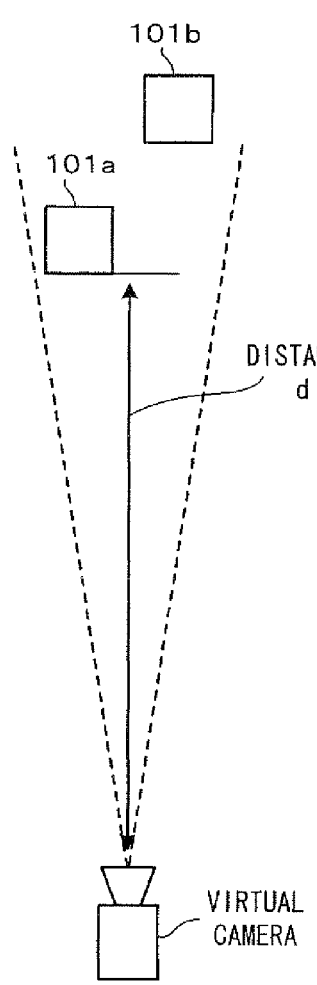
FIGS. 17A to 17C are diagrams for describing a process when a plurality of 3D models are displayed on a screen.
Figure 17B:
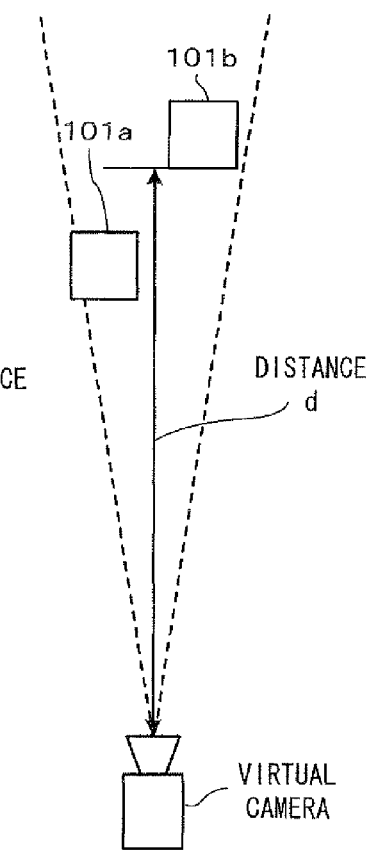
Figure 17C:
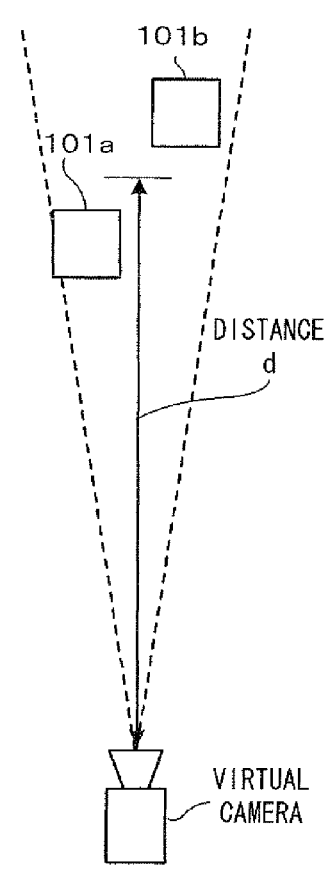
Figure 18A:
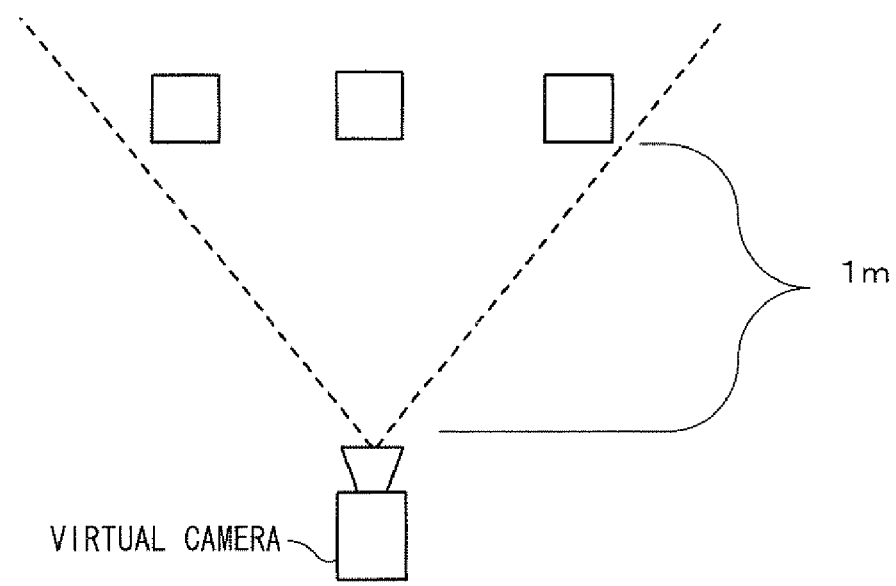
FIGS. 18A and 18B are diagrams showing a relationship between a virtual camera and cubic models in a virtual space.
Figure 18B:
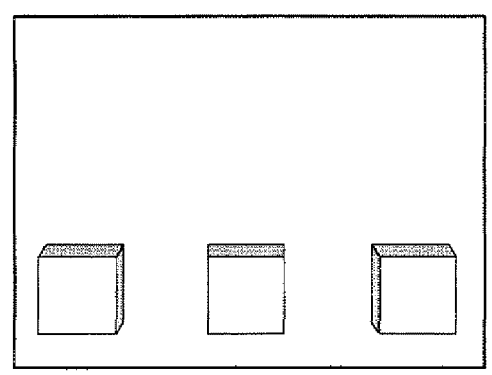
Figure 19:
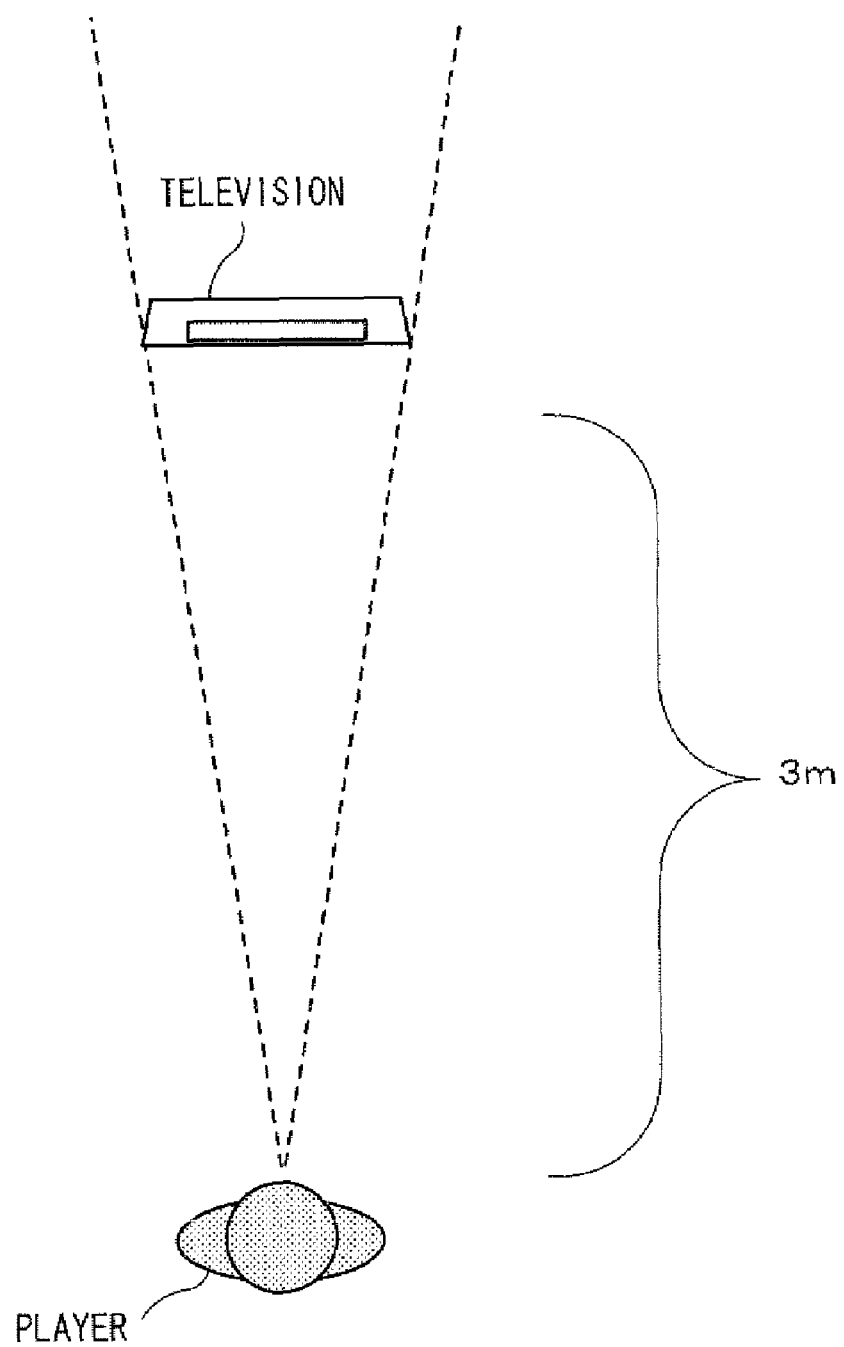
FIG. 19 is a diagram showing a positional relationship between a player and a television in a real space.
Figure 20:
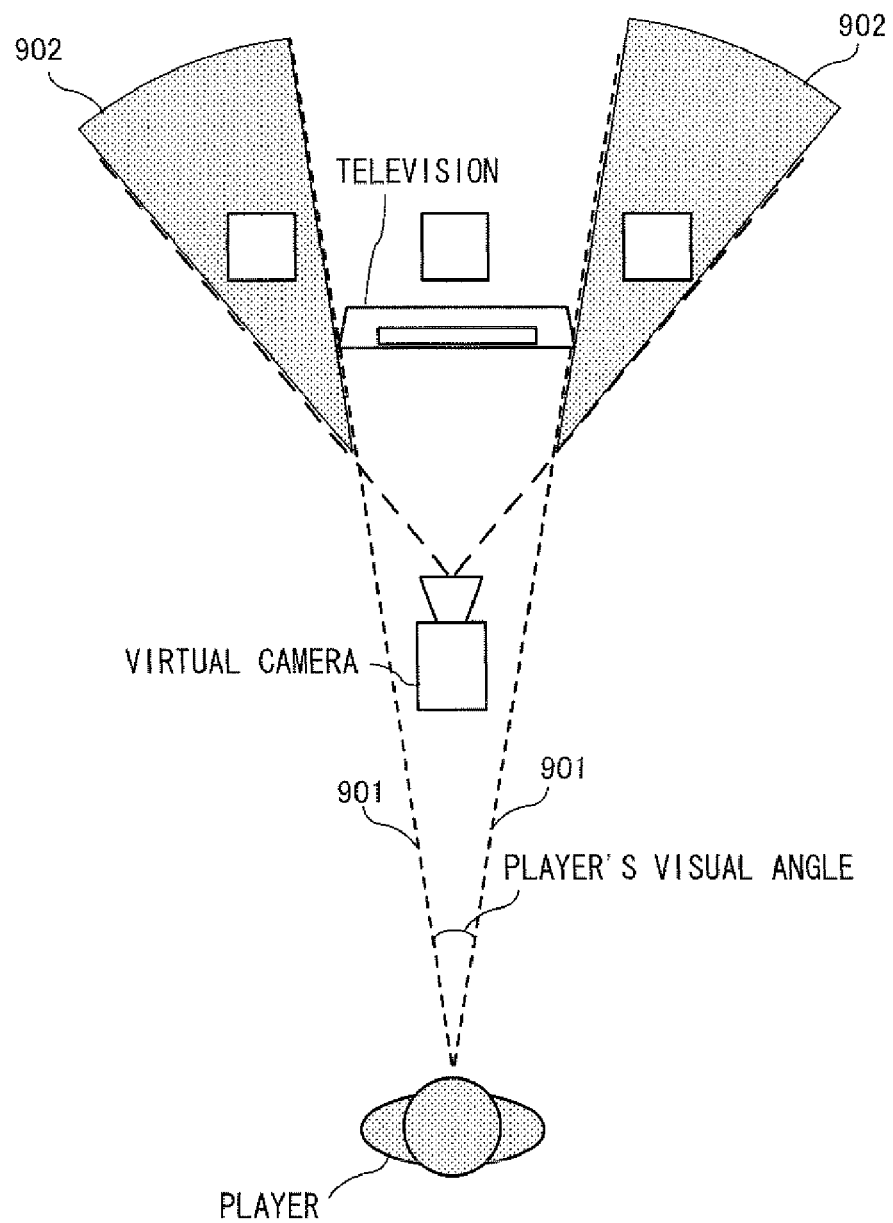
FIG. 20 is a diagram showing a relationship between an angle of view of a virtual camera and a visual angle of a player.

Also, when a plurality of 3D models are displayed on the screen, the virtual camera is preferably placed with reference to a 3D model that is located closest to the player (the virtual camera is focused on the closest 3D model). For example, it is assumed that two cubic models 101 as shown in FIG. 11B are displayed and placed at positions that are different from each other in a depth direction, i.e., one of the two cubic models is placed closer to the player than the other cubic model is (the other cubic model is placed farther from the player). In this case, as shown in FIG. 17A, a position of the 3D model closest to the player may be set to be (ax, ay, az) shown in step S2, and the virtual camera may be placed at a position that is located the distance d away from the position (ax, ay, az). Thereby, the 3D model closest to the player is displayed as if it were located behind the screen of the television 2, thereby making it possible to provide a realistic image without unnaturalness. In addition, as shown in FIG. 17B, the virtual camera may be placed with reference to a position of a 3D model that is located at a deeper position as viewed from the player. Alternatively, as shown in FIG. 17C, the virtual camera may be placed with reference to a middle position of a distance in a depth direction within which a plurality of 3D models are located. When the virtual camera is placed as shown in FIG.

17B or 17C, a 3D model closer to the player can be displayed as if it were located closer to the player than the screen of the television 2 is. Also in this case, it is possible to provide a realistic image as if a 3D model were located closer to the player than the screen of the television 2 is.

While certain example embodiments have been described in detail, the foregoing description is in all aspects illustrative and not restrictive. It is understood that numerous other modifications and variations can be devised without departing from the scope of the invention.

What is claimed is:

1. A non-transitory computer readable storage medium storing an image processing program executable by a processing system of an image processing apparatus for outputting an image of a virtual space captured by a virtual camera to a display device, the program comprising instructions that are configured to:
   obtain displayed region size data indicating a size of a screen of the display device, or a size of a region in which the image of the virtual space is displayed on the screen;
   obtain distance data indicating a distance between a user and the display device; and
   set a position and an angle of view of the virtual camera in the virtual space based on the displayed region size data and the distance data.

2. The medium of claim 1, wherein
   the displayed region size data includes data indicating a width in a first direction and a width in a second direction perpendicular to the first direction, of the screen of the display device or the region in which the image of the virtual space is displayed on the screen, and
   the instructions are further configured to set a horizontal angle of view and a vertical angle of view of the virtual camera, based on the width in the first direction or the width in the second direction.

3. The medium of claim 2, wherein
   the horizontal angle of view and/or the vertical angle of view of the virtual camera is set to increase as the width in the first direction and/or width in the second direction increase.

4. The medium of claim 2, wherein
   the horizontal angle of view and/or the vertical angle of view is set to be smaller as the distance indicated by the distance data increases.

5. The medium of claim 1, wherein
   the angle of view of the virtual camera is set to be larger as the screen of the display device or the region in which the image of the virtual space is displayed on the screen increases.

6. The medium of claim 1, wherein
   the angle of view is set to be smaller as the distance indicated by the distance data increases.

7. The medium of claim 1, wherein the instructions are further configured to:
   obtain captured image data output from an input device including an imager for capturing an image of at least one imaging subject which is placed in a vicinity of the display device; and
   calculate a distance between the input device and the imaging subject as a distance between the user and the display device based on the imaging subject shown in the captured image indicated by the captured image data.

8. The medium of claim 1, wherein the instructions are further configured to:
   determine the position and the angle of view of the virtual camera with reference to a position of the object when an object exists in a space to be displayed on the screen of the display device or the region in which the image of the virtual space is displayed on the screen.

9. The medium of claim 1, wherein the instructions are further configured to:
   when a plurality of objects exist in a space to be displayed on the screen of the display device or the region in which the image of the virtual space is displayed on the screen, in the virtual space, determine the position and the angle of view of the virtual camera with reference to a position of an object closest to the virtual camera.

10. The medium of claim 1, wherein:
    the angle of view is set to be narrower as the distance indicated by the distance data increases, and
    the angle of view is set to be larger as the distance indicated by the distance data decreases.

11. A non-transitory computer readable storage medium storing an image processing program executable by a processing system of an image processing apparatus for outputting an image of a virtual space captured by a virtual camera to a display device, the program comprising instructions that are configured to:
    obtain displayed region size data indicating a size of a screen of the display device, or a size of a region in which the image of the virtual space is displayed on the screen, the displayed region size data includes data indicating a width in a first direction and a width in a second direction perpendicular to the first direction, of the screen of the display device or the region in which the image of the virtual space is displayed on the screen;
    obtain distance data indicating a distance between a user and the display device;
    set a position and an angle of view of the virtual camera in the virtual space based on the displayed region size data and the distance data; and
    set a horizontal angle of view and a vertical angle of view of the virtual camera based on the width in the first direction and the width in the second direction.

12. The medium of claim 11, wherein
    the horizontal angle of view and/or the vertical angle of view of the virtual camera is set to increase as the width in the first direction and/or the width in the second direction increase.

13. The medium of claim 11, wherein
    the horizontal angle of view and/or the vertical angle of view is set to be smaller as the distance indicated by the distance data increases.

14. A non-transitory computer readable storage medium storing an image processing program executable by a processing system of an image processing apparatus for outputting an image of a virtual space captured by a virtual camera to a display device, the program comprising instructions that are configured to:
    obtain displayed region size data indicating a size of a screen of the display device, or a size of a region in which the image of the virtual space is displayed on the screen;
    obtain distance data indicating a distance between a user and the display device;
    set a position and an angle of view of the virtual camera in the virtual space based on the displayed region size data and the distance data;
    obtain captured image data output from an input device including an imager for capturing an image of at least one imaging subject which is placed in a vicinity of the display device; and
    calculate a distance between the input device and the imaging subject as a distance between the user and the display device based on the imaging subject shown in the captured image indicated by the captured image data,
wherein the distance between the input device and the imaging subject is calculated based on a size of the imaging subject shown in the captured image.

15. The medium of claim 14, wherein
the calculated distance between the input device and the imaging subject decreases as the size of the imaging subject shown in the captured image increases.

16. A non-transitory computer readable storage medium storing an image processing program executable by a processing system of an image processing apparatus for outputting an image of a virtual space captured by a virtual camera to a display device, the program comprising instructions that are configured to:
obtain displayed region size data indicating a size of a screen of the display device, or a size of a region in which the image of the virtual space is displayed on the screen;
obtain distance data indicating a distance between a user and the display device;
set a position and an angle of view of the virtual camera in the virtual space based on the displayed region size data and the distance data;
obtain captured image data output from an input device including an imager for capturing an image of at least one imaging subject which is placed in a vicinity of the display device; and
calculate a distance between the input device and the imaging subject as a distance between the user and the display device based on the imaging subject shown in the captured image indicated by the captured image data,
wherein the distance between the input device and the imaging subject is calculated based on a distance between a plurality of imaging subjects shown in the captured image.

17. The medium of claim 16, wherein
the calculated distance between the input device and the imaging subject decreases as a distance between a plurality of imaging subjects increases.

18. An image processing apparatus for outputting an image of a virtual space captured by a virtual camera to a display device, comprising:
a processing system that includes at least one processor, the processing system configured to:
obtain displayed region size data indicating a size of a screen of the display device, or a size of a region in which the image of the virtual space is displayed on the screen;
obtain distance data indicating a distance between a user and the display device; and
set a position and an angle of view of the virtual camera in the virtual space based on the displayed region size data and the distance data.

19. An image processing system that is configured to output an image of a virtual space to a display device, the system comprising:
at least one processor that is configured to:
obtain size data that relates to a size of the display device or a size of a region in which the image of the virtual space is displayed on a screen of the display device;
obtain distance data that relates to a distance between a user and the display device;
set a position of a virtual camera in the virtual space based on the size data and the distance data; and
set an angle of view of the virtual camera in the virtual space based on the size data and the distance data.

20. A computer implemented method for outputting an image of a virtual space to a display device, the method comprising:
obtaining, via a processing system that includes at least one processor, size data that relates to a size of the display device or a size of a region in which the image of the virtual space is displayed on a screen of the display device;
obtaining distance data that relates to a distance between a user and the display device;
setting a position of a virtual camera, via the processing system, in the virtual space based on the size data and the distance data; and
setting an angle of view of the virtual camera in the virtual space based on the size data and the distance data.

21. An image processing system that is configured to output a view of a virtual space provided from a virtual camera to a display device, the system comprising at least one processor that is configured to:
obtain size data that relates to a size of the display device, or a size of a region of the display device in which the view of the virtual space is output, the size data including a first width in a first direction and a second width in a second direction that is substantially perpendicular to the first direction, wherein the first and second widths are associated with the display device or the region of the display device;
obtain distance data that relates to a distance between a user and the display device;
set a position and an angle of view of the virtual camera in the virtual space based on the obtained size data and distance data; and
set a horizontal angle of view and a vertical angle of view of the virtual camera based on the first width and the second width.

22. A computer implemented method for outputting a view of a virtual space provided from a virtual camera to a display device, the method comprising:
obtaining size data that relates to a size of the display device, or a size of a region of the display device in which the view of the virtual space is output, the size data including a first width in a first direction and a second width in a second direction that is substantially perpendicular to the first direction, wherein the first and second widths are associated with the display device or the region of the display device;
obtaining distance data, via a processing system that includes at least one processor, that relates to a distance between a user and the display device;
setting a position and an angle of view of the virtual camera in the virtual space based on the obtained size data and distance data; and
setting a horizontal angle of view and a vertical angle of view, via the processing system, of the virtual camera based on the first width and the second width.

23. An image processing apparatus for outputting an image of a virtual space captured by a virtual camera to a display device, the apparatus comprising:
a processing system that includes at least one processor, the processing system configured to:
obtain size data that relates to a size of the display device, or a size of a region of the display device in which the view of the virtual space is output, the size data including a first width in a first direction and a second width in a second direction that is substantially perpendicular to the first direction, wherein the first and second widths are associated with the display device or the region of the display device;

obtain distance data that relates to a distance between a user and the display device;

set a position and an angle of view of the virtual camera in the virtual space based on the obtained size data and distance data; and set a horizontal angle of view and a vertical angle of view of the virtual camera based on the first width and the second width.

24. An image processing system that is configured to output an image of a virtual space that is captured by a virtual camera to a display device, the system comprising at least one processor that is configured to:

obtain displayed region size data indicating a size of a screen of the display device, or a size of a region in which the image of the virtual space is displayed on the screen;

obtain distance data indicating a distance between a user and the display device;

set a position and an angle of view of the virtual camera in the virtual space based on the displayed region size data and the distance data;

obtain captured image data output from an input device including an imager for capturing an image of at least one imaging subject which is placed in a vicinity of the display device; and calculate a distance between the input device and the imaging subject as a distance between the user and the display device based on the imaging subject shown in the captured image indicated by the captured image data, wherein the distance between the input device and the imaging subject is calculated based on a size of the imaging subject shown in the captured image.

25. A computer implemented method for outputting an image of a virtual space to a display device, the image associated with a view of the virtual space provided from a virtual camera, the method comprising:

obtaining displayed region size data indicating a size of a screen of the display device, or a size of a region in which the image of the virtual space is displayed on the screen;

obtaining distance data indicating a distance between a user and the display device;

setting a position and an angle of view of the virtual camera in the virtual space based on the displayed region size data and the distance data;

obtaining captured image data output from an input device including an imager for capturing an image of at least one imaging subject which is placed in a vicinity of the display device; and calculating, via a processing system that includes at least one processor, a distance between the input device and the imaging subject as a distance between the user and the display device based on the imaging subject shown in the captured image indicated by the captured image data, wherein the distance between the input device and the imaging subject is further calculated based on a size of the imaging subject shown in the captured image.

26. An image processing apparatus for outputting an image of a virtual space captured by a virtual camera to a display device, the apparatus comprising:

a processing system that includes at least one processor, the processing system configured to:

obtain displayed region size data indicating a size of a screen of the display device, or a size of a region in which the image of the virtual space is displayed on the screen;

obtain distance data indicating a distance between a user and the display device;

set a position and an angle of view of the virtual camera in the virtual space based on the displayed region size data and the distance data;

obtain captured image data output from an input device including an imager for capturing an image of at least one imaging subject which is placed in a vicinity of the display device; and calculate a distance between the input device and the imaging subject as a distance between the user and the display device based on the imaging subject shown in the captured image indicated by the captured image data, wherein the distance between the input device and the imaging subject is calculated based on a size of the imaging subject shown in the captured image.

27. An image processing system that is configured to output an image of a virtual space that is captured with a virtual camera to a display device, the system comprising at least one processor that is configured to:

obtain displayed region size data indicating a size of a screen of the display device, or a size of a region in which the image of the virtual space is displayed on the screen;

obtain distance data indicating a distance between a user and the display device;

set a position and an angle of view of the virtual camera in the virtual space based on the displayed region size data and the distance data;

obtain captured image data output from an input device including an imager for capturing an image of at least one imaging subject which is placed in a vicinity of the display device; and calculate a distance between the input device and the imaging subject as a distance between the user and the display device based on the imaging subject shown in the captured image indicated by the captured image data, wherein the distance between the input device and the imaging subject is calculated based on a distance between a plurality of imaging subjects shown in the captured image.

28. A computer implemented method for outputting an image of a virtual space to a display device, the method comprising:

obtaining displayed region size data indicating a size of a screen of the display device, or a size of a region in which the image of the virtual space is displayed on the screen;

obtaining distance data indicating a distance between a user and the display device;

setting a position and an angle of view of the virtual camera in the virtual space based on the displayed region size data and the distance data;

obtaining captured image data output from an input device including an imager for capturing an image of at least one imaging subject which is placed in a vicinity of the display device; and calculating, via a processing system that includes at least one processor, a distance between the input device and the imaging subject as a distance between the user and the display device based on the imaging subject shown in the captured image indicated by the captured image data, wherein the distance between the input device and the imaging subject is calculated based on a distance between a plurality of imaging subjects shown in the captured image.

29. An image processing apparatus for outputting an image of a virtual space captured by a virtual camera to a display device, the apparatus comprising:
    a processing system that includes at least one processor, the processing system configured to:
        obtain displayed region size data indicating a size of a screen of the display device, or a size of a region in which the image of the virtual space is displayed on the screen;
        obtain distance data indicating a distance between a user and the display device;
        set a position and an angle of view of the virtual camera in the virtual space based on the displayed region size data and the distance data;
        obtain captured image data output from an input device including an imager for capturing an image of at least one imaging subject which is placed in a vicinity of the display device; and
        calculate a distance between the input device and the imaging subject as a distance between the user and the display device based on the imaging subject shown in the captured image indicated by the captured image data, wherein the distance between the input device and the imaging subject is calculated based on a distance between a plurality of imaging subjects shown in the captured image.

\* \* \* \* \*